(12) United States Patent
LaComb

(10) Patent No.: US 9,246,300 B2
(45) Date of Patent: Jan. 26, 2016

(54) MODE TAILORED SPHERICAL LASER

(75) Inventor: Ronald LaComb, W. Greenwich, RI (US)

(73) Assignee: Ronald Lacomb, W. Greenwich, RI (US)

(*) Notice: Subject to any disclaimer, the term of this patent is extended or adjusted under 35 U.S.C. 154(b) by 483 days.

(21) Appl. No.: 13/486,785

(22) Filed: Jun. 1, 2012

(65) Prior Publication Data

US 2013/0322475 A1    Dec. 5, 2013

(51) Int. Cl.
| | |
|---|---|
| *H01S 3/08* | (2006.01) |
| *H01S 3/0941* | (2006.01) |
| *H01S 3/00* | (2006.01) |
| *H01S 3/04* | (2006.01) |
| *H01S 3/22* | (2006.01) |

(52) U.S. Cl.
CPC ............. *H01S 3/08* (2013.01); *H01S 3/0071* (2013.01); *H01S 3/0407* (2013.01); *H01S 3/08081* (2013.01); *H01S 3/0941* (2013.01); *H01S 3/2222* (2013.01); *H01S 2301/02* (2013.01)

(58) Field of Classification Search
CPC ..... H01S 3/0407; H01S 3/08; H01S 3/08081; H01S 3/0941; H01S 3/2222; H01S 3/0071; H01S 2301/02
See application file for complete search history.

(56) References Cited

U.S. PATENT DOCUMENTS

| | | | | | |
|---|---|---|---|---|---|
| 4,829,537 | A | * | 5/1989 | Baer | 372/66 |
| 2002/0080842 | A1 | * | 6/2002 | An et al. | 372/92 |

OTHER PUBLICATIONS

Lee et al., "Single radial-mode lasing in a submicron-thickness spherical shell microlaser", Applied Physics Letters 90, 201102 (2007), pp. 1-3.*

* cited by examiner

*Primary Examiner* — Xinning Niu
(74) *Attorney, Agent, or Firm* — Grogan, Tuccillo & Vanderleeden, LLP

(57) ABSTRACT

A spherical laser includes a transparent or semi-transparent outer spherical vessel having an internal cavity, an amplifying medium in the cavity, and means to excite the amplifying medium. The sphere is provided with a partially reflective coating to act as a spherical optical resonator. The spherical resonator includes a plurality of optically different regions containing alternative optical media from the cavity medium differing in bulk optical parameters utilized for mode tailoring. The optically different regions work collectively to exclude the whispering gallery modes from those supported by the spherical cavity. Excitation of the amplifying medium produces an optical gain. When the gain exceeds cavity losses and threshold conditions are met, lasing is supported. This creates a three-dimensional, spherically radiating emission, emulating a point source. The sphere is enclosed within a mirrored ellipse to image the output to a point, or within a mirrored parabola to columinate the emission.

7 Claims, 23 Drawing Sheets

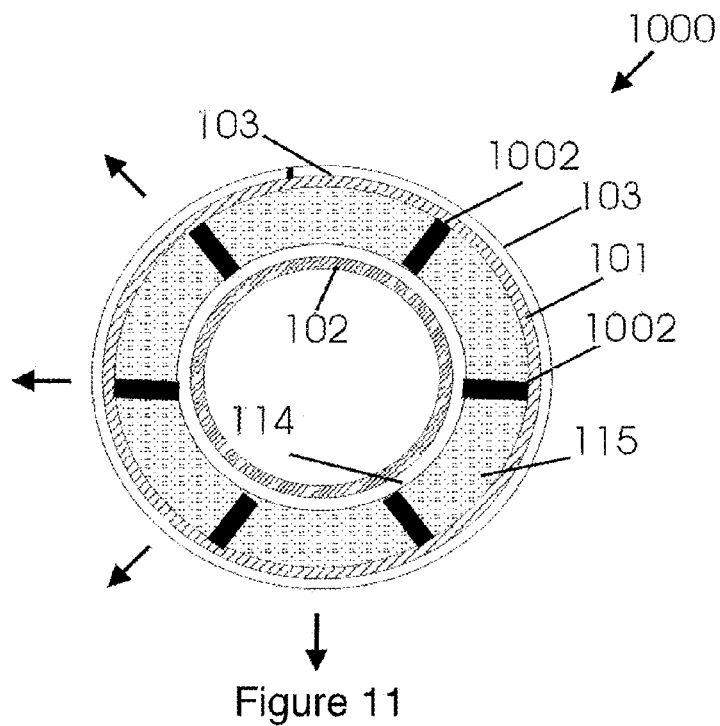
Figure 11
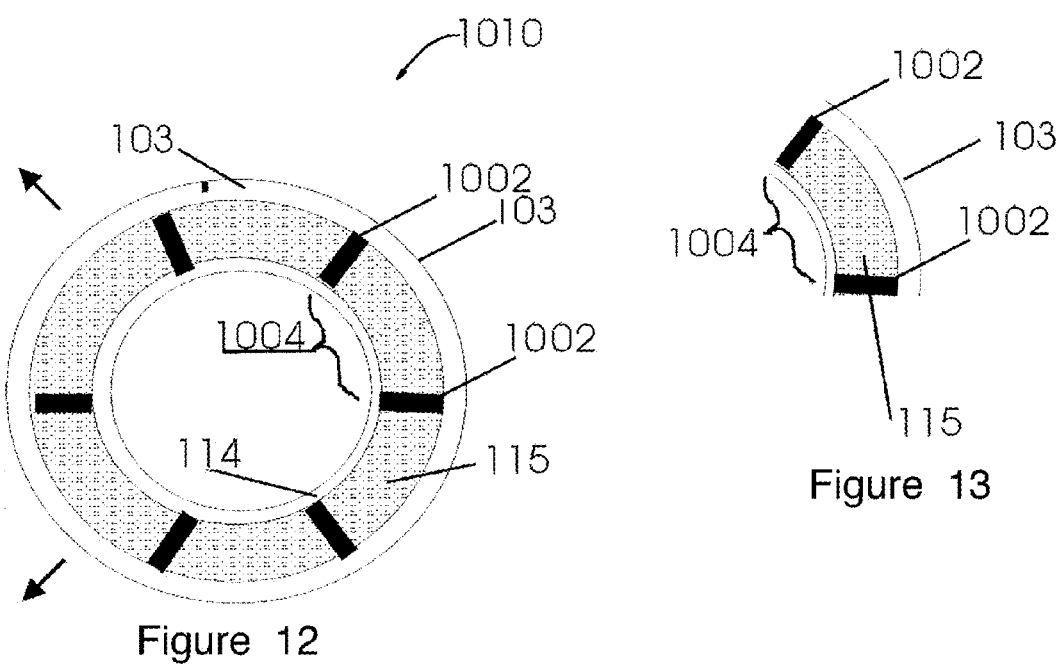
Figure 12
Figure 13

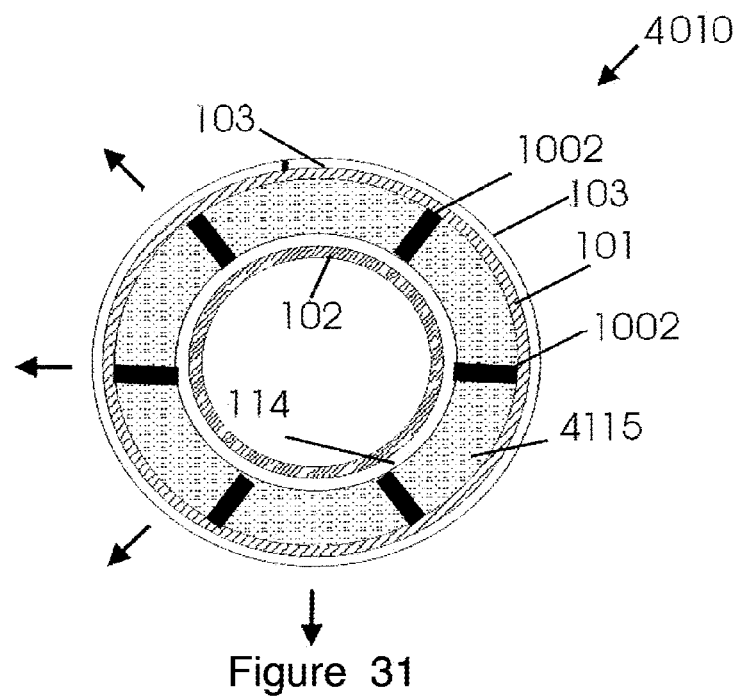
Figure 31
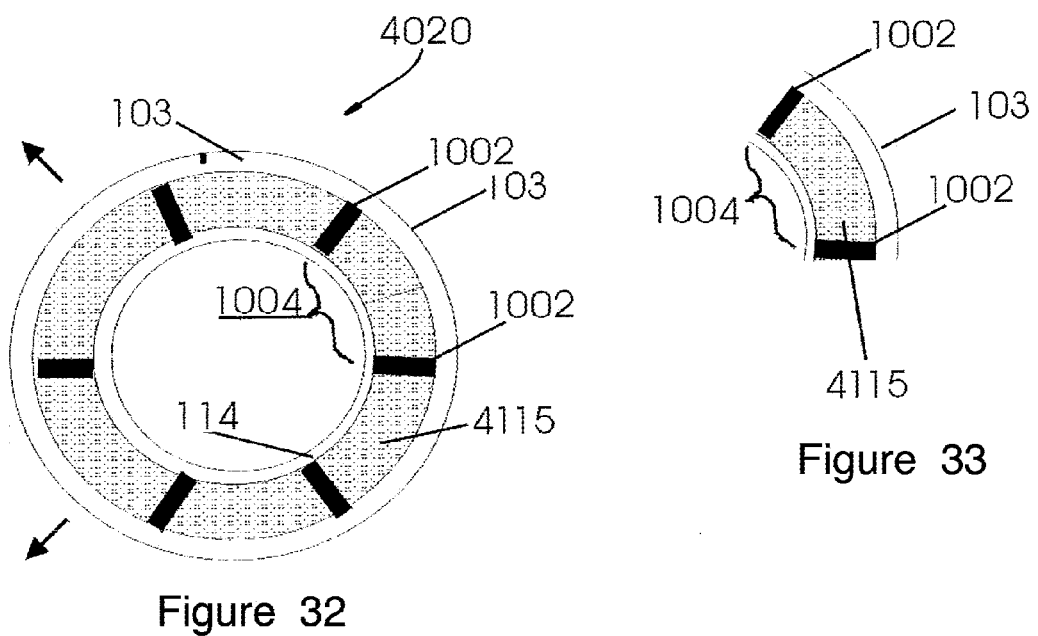
Figure 32
Figure 33

MODE TAILORED SPHERICAL LASER

FIELD OF THE INVENTION

The present invention relates to coherent light generators and, more particularly, to coherent light generations having a spherical resonant cavity.

BACKGROUND OF THE INVENTION

Modern lasers including semiconductor lasers, gas lasers, chemical lasers, and solid state lasers utilize optical cavities consisting of two mirrors or prisms arranged to form closed optical paths of low loss, into which an amplifying medium is inserted. The amplifying medium enclosed within the optical cavity may be gaseous, liquid, crystalline, or a glassy solid. Laser oscillation will occur at specific frequencies if the gain of the medium exceeds cavity losses. Gain of the medium is dependent upon the stimulated emission rate, which is increased when population inversion is present (a necessary condition for lasing). The onset of laser oscillation is governed by threshold conditions and stabilizes at a level that depends on the saturation intensity of the amplifying medium and the reflectance of the mirrors. The beam exits the resonator via an output coupler ("OC"), e.g., a mirror with a reflectivity of less than 1 for the lasing wavelength, in a direction perpendicular to the OC mirror, thereby establishing a directed beam of light (coherent or incoherent, as the case may be). The exiting laser beam propagates in a single direction while supporting lateral and longitudinal modes indicative of the laser design and operation. Gain saturation and second order effects limit the maximum output power of conventional lasers, thereby limiting their scalability. Many applications utilize a focused laser beam, including microscopy, industrial applications (e.g., welding, cutting, and writing), and printing, among others. The minimum spot size achievable is limited by diffraction to approximately one half the wavelength of excitation.

SUMMARY OF THE INVENTION

An embodiment of the present invention relates to a spherical laser apparatus. The apparatus includes a generally spherical body having a semi-reflective surface, e.g., the surface is less than 100% reflective at a frequency bandwidth of interest. "Spherical" means having a surface defined by a set of points in 3-dimensional space that are equidistant from a center point, including semi-spherical surfaces. By "generally" spherical, it is meant spherical within a small percentage due to manufacturing tolerances. The generally spherical body includes an amplifying medium, e.g., the body contains or is composed of the amplifying medium. By "amplifying medium," it is meant one or more gaseous, solid, or liquid materials that generate/emit photons upon excitation of the material(s). (For simplicity of illustration, the term "medium" as used herein refers to one medium or multiple mediums/media). The apparatus also includes an excitation device for controllable excitation of the amplifying medium. In operation, when the excitation device is controlled to excite the amplifying medium to meet lasing threshold conditions, the generally spherical body emits coherent light, e.g., a radially diverging, three-dimensional beam of coherent light, emulating a point source.

In another embodiment, the generally spherical body includes an outer, generally spherical vessel made of a transparent or semi-transparent substrate material (e.g., transparent at least to frequencies of interest) such as glass or quartz. The outer vessel is provided with a semi-reflective coating to form a spherical optical resonator. An amplifying medium is contained within the outer sphere. Excitation means are provided for exciting the amplifying medium. Excitation of the amplifying medium produces an optical gain. When the gain exceeds cavity losses and threshold conditions are met, lasing is supported. This creates a three-dimensional, spherically radiating output of coherent/laser light through the outer sphere. The output is radially diverging, but at least a portion of the output may be collected (e.g., reflected and/or directed) using a mirror apparatus positioned externally to the spherical laser. For example, the spherical laser may be enclosed within a 3-dimensional, mirrored ellipse to image the output to a point (or partially enclosed within an open-ended mirror ellipse), or within a mirrored parabola to columnate the emission.

In another embodiment, the amplifying medium is an optically excitable or optically active medium. If the medium is a solid or glassy solid, e.g., a doped glass/crystal, the sphere may be a spherical body composed of the optically active medium. Alternatively, the sphere may comprise a spherical vessel (e.g., made of quartz, glass, or other suitable substrate material) having an interior cavity filled with the optically active medium. The sphere is provided with a semi-reflective coating, on the outer surface of the sphere if the sphere is solid, or possibly on the interior surface of the sphere if the sphere has an interior cavity. A "window" in the reflective coating is provided for the admittance of optical stimulation, e.g., radiation at a certain wavelength for exciting the optically active medium. In other words, the coating is semi-reflective at a first frequency bandwidth, with a small area of the coating (forming the window) being transparent to a second frequency bandwidth for admitting optical stimulation. With ample stimulation the sphere will lase, emitting a spherical mode or modes at a wavelength specified by the optically active amplifying media.

In another embodiment, the spherical laser includes a spherical optical resonator having inner and outer, concentric spheres, each made from glass, quartz, or another suitable substrate material. The spheres have mirrored surfaces to provide optical feedback. The mirrored surface of the outer sphere is semi-reflective. The outer sphere has a radius larger than the inner sphere, with the amplifying medium being enclosed in the volume between the concentric spheres. The amplifying medium may be liquid, solid, or gaseous, and may be excited by electrical, optical, or chemical means, depending on the particular medium. The spherical laser includes a mechanism/apparatus (excitation means) for exciting the amplifying medium. When the amplifying medium is sufficiently excited to generate photons exceeding lasing threshold conditions, the outer sphere emits a radially diverging, three-dimensional laser beam. A cooling mechanism may be provided for heat dissipation. The emitted beam can be imaged to a non diffraction-limited spot by utilizing a three-dimensional ellipsoidal mirror, or it can be columnated using a three-dimensional parabolic mirror.

In another embodiment, a mode tailored spherical resonator comprising of a single mirrored sphere or two concentric mirrored spheres, one with larger radii than the other enclosing an optical medium and optically different regions for mode tailoring to aid in the prevention of whispering gallery modes from the allowed modal constituency. The spherical resonator can be utilized as a mode converter or a spherical laser when the cavity is comprised of an optically amplifying medium with proper photonic excitement. Ether the single or concentric mode tailored spherical cavity supports radial modes, incorporating an optically active cavity and adequate excitation produces a radially diverging three dimensional laser beam.

In still another embodiment, the spherical laser includes a spherical optical resonator having inner and outer, concentric spheres, each made from glass, quartz, or another suitable substrate material. The spheres have mirrored surfaces to provide optical feedback. The mirrored surface of the outer sphere is semi-reflective and has a plurality of optically different regions extending diametrically about the mirrored surface to obstruct the optical path of a whispering gallery mode. The outer sphere has a radius larger than the inner sphere, with the amplifying medium being enclosed in the volume between the concentric spheres. The amplifying medium may be liquid, solid, or gaseous, and may be excited by electrical, optical, or chemical means, depending on the particular medium. The spherical laser includes a mechanism/apparatus (excitation means) for exciting the amplifying medium. When the amplifying medium is sufficiently excited to generate photons exceeding lasing threshold conditions, the outer sphere emits a radially diverging, three-dimensional laser beam. A cooling mechanism may be provided for heat dissipation. The emitted beam can be imaged to a non diffraction-limited spot by utilizing a three-dimensional ellipsoidal mirror, or it can be columnated using a three-dimensional parabolic mirror.

The optical cavity resonator supports spherical modes, e.g., radial and angular modes. The output power is scalable with spherical geometry. The radial components of the spherical modes depend upon the difference in radii between the inner and outer spheres. Increasing both radii proportionally while maintaining a constant cavity length (e.g., distance of separation between the spheres) increases the active cavity volume without affecting the nature of the radial modes and saturation conditions of the amplifying medium. This results in a scalable power source.

BRIEF DESCRIPTION OF THE DRAWINGS

The present invention will be better understood from reading the following description of non-limiting embodiments, with reference to the attached drawings, wherein below:

FIG. 11 illustrates spherical laser according to an embodiment of the present invention.

FIG. 12 illustrates spherical laser according to an embodiment of the present invention.

FIG. 13 illustrates spherical laser according to the embodiment of FIG. 12.

FIG. 31 illustrates spherical resonator according to an embodiment of the present invention.

FIG. 32 illustrates spherical resonator according to an embodiment of the present invention.

FIG. 33 illustrates spherical resonator according to an embodiment of the FIG. 32.

DETAILED DESCRIPTION OF THE PREFERRED EMBODIMENT

A Scalable Spherical Laser is described in U.S. Pat. No. 7,492,805, which list the present inventor Ronald LaComb and Sallie Townsend as inventors and is incorporated herein by reference.

Figure 1A:
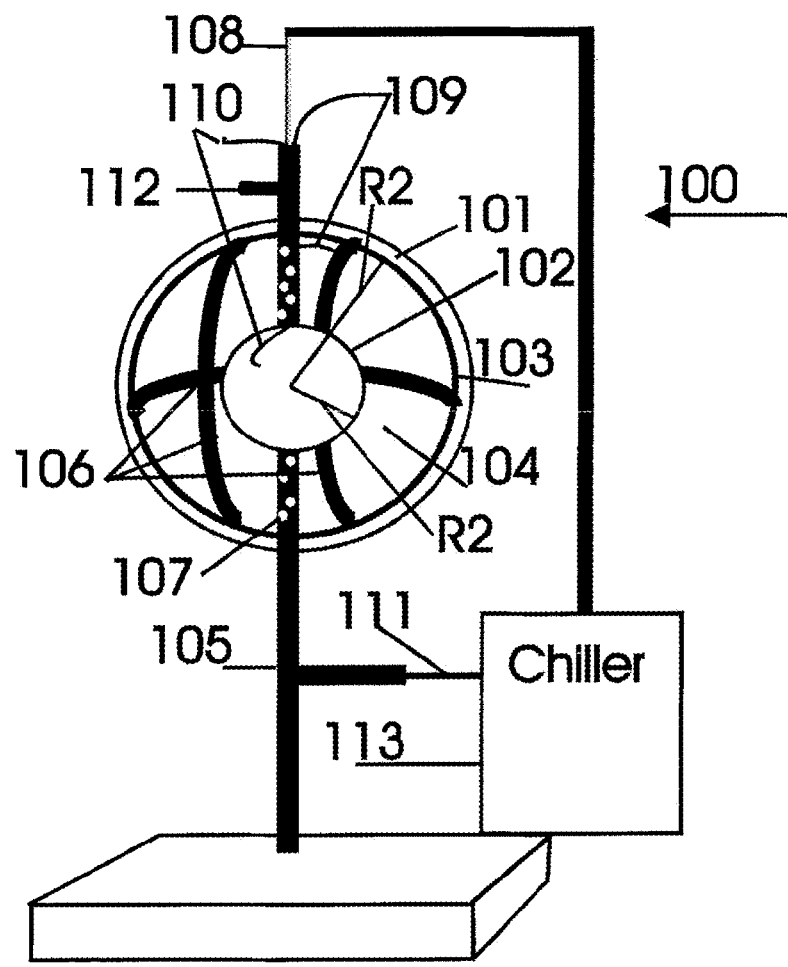
FIG. 1A is a schematic view, partially in cross section, of a scalable spherical laser according to an embodiment of the present invention.
Figure 1B:
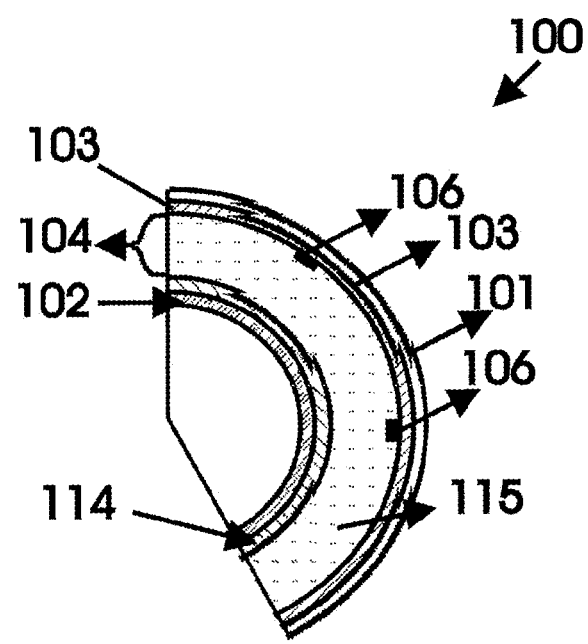
FIG. 1B is a detail view of a portion of the spherical laser in FIG. 1A (component sizes are not to scale, for illustration purposes).

A first embodiment of a scalable spherical laser 100 is shown in FIGS. 1A and 1B. The laser 100 is applicable for use with active amplifying media that do not rely upon vessel sidewall collisions for population inversion. These include molecular, chemical, and similar active media. The spherical laser 100 includes an outer, hollow, vessel-like, generally spherical body 101 ("outer sphere") and an inner, hollow, generally spherical vessel 102 ("inner sphere"). The inner and outer spheres may be concentric. The outer sphere 101 is occasionally referred to herein as the output coupler ("OC") of the laser 100. The outer sphere 101 (shown in cross section in FIG. 1 to illustrate internal components) has a radius R1 greater than that of a radius R2 of the inner sphere 102, e.g., R1>R2. The spheres 101, 102 may be made of glass, quartz, metal, another suitable substrate material, or a combination thereof. A reflective coating is provided on at least one surface of each of the concentric spheres 101, 102. Typically, the convex, outwards facing surface of the inner sphere 102 will be provided with a reflective coating 114 (see FIG. 1B), and the concave, inwards facing surface of the outer sphere 101 will be provided with a reflective coating 103. The reflective coatings may be either metal coatings or multi-layered dielectric coatings. Multi-wavelength operation can also be achieved by utilizing a uniform gain medium with a broad emission spectrum, and reflective coatings designed to amplify multiple wavelengths. The concentric mirrored spheres 101, 102 thus create a spherical optical resonator (spherical optical resonator means) with a resonator cavity length "L", where L=R1−R2.

The cavity region 104 located between the concentric spheres is used to house an amplifying medium 115 (see FIG. 1B). The amplifying medium 115 may be solid, liquid, or gaseous, in each case comprising a system of molecules, atoms, or other particles that can be stimulated electrically, chemically, or optically. Stimulation sets the particles into an excited energy state. Subsequently, upon relaxing to a lower energy state, the particles produce electromagnetic wave energy. If electrical pumping is required for stimulating the medium, electrical contacts or electrodes 106, 116 are included at the spherical surfaces of the inner and outer spheres 101, 102, and an electric potential/voltage is applied between the contacts (DC or AC), thereby forming an electric field throughout the active region, e.g., in the cavity 104 or portion thereof. The electrical contacts may be a transparent conducting film, e.g., ultra-thin transparent metal or indium tin oxide (ITO) 116 (see FIG. 1B), or a sparse conducting metal mesh 106. If the reflective coatings 103, 114 have suitable electrical characteristics, they may also be used as the electrical contacts/electrodes. The contacts are positioned on the interior spherical surface of the outer sphere 101 facing the cavity 104, and on the exterior spherical surface of the inner sphere 102. External contacts are made using an electrical contact lead 109 running from the cavity 104 to the exterior of the outer sphere, and an electrical contact lead 110 running from the inner sphere to the exterior of the outer sphere. The contact leads 109, 100 may be fed through a hollow insulating rod 105 that holds the spheres in place. If the reflective coating 103 of the outer sphere 101 has an optical transmission peak corresponding to the pump source wavelength, optical pumping can be accomplished by pumping directly through the outer sphere 101. Alternatively, optical pumping can be carried out using a transmission window formed in the outer reflective coating.

The concentric spheres 101, 102 may be held in place using a support apparatus 105. As shown in FIG. 1A, the support may be a hollow insulating rod. The hollow rod 105 may contain internal holes 107 for gas flow within the cavity, ducts for the leads 109, 110, and ducts 108 for liquid cooling purposes. Charging the cavity 104 with a gas or liquid active medium is accomplished through a port 112 in the rod 105. For atomic, ionic, and molecular gas media, the port 112 may be sealed off once the cavity 104 is filled. Alternatively, for chemically active media, the port 112 can be utilized as a gas source, with gas flowing out of upper holes 107 (e.g., located in the upper hemisphere of the cavity 104), into the interior 104, back into the rod 105 through bottom internal cavity holes (e.g., in the lower hemisphere of the cavity), and exiting out through an exhaust duct (not shown). Here, the rod 105 would either not extend into or entirely through the inner sphere 102, or the interior of the rod extending through the inner sphere would be sealed off.

A cooling unit or "chiller" 113 may be provided to remove excess interior heat generated during laser operation, for cooling the spherical resonator. Cooling is carried out by circulating a liquid or gaseous coolant from the chiller 113, through a coolant duct 108 in the rod 105 that passes through the inner sphere 102, down through an exit duct 111, and back into the chiller 113. Typically, the coolant duct 108 will have a smaller diameter than the support rod 105, which allows the support rod to act as a possible duct for gas circulation in conjunction with the exit ports 107 located inside the cavity 104. The interior of the inner sphere 102 may be provided with baffles (not shown) for distributing the coolant in the interior of the inner sphere, for facilitating increased rates of heat exchange.

Figure 2:
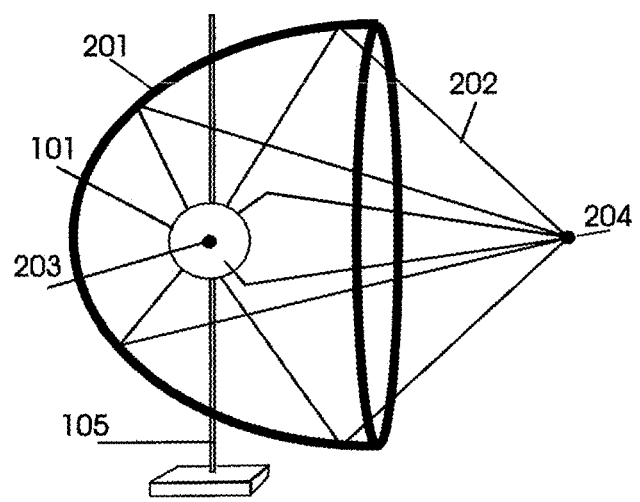
FIG. 2 is a schematic view of the spherical laser in use with an ellipsoidal collection mirror.
Figure 3:
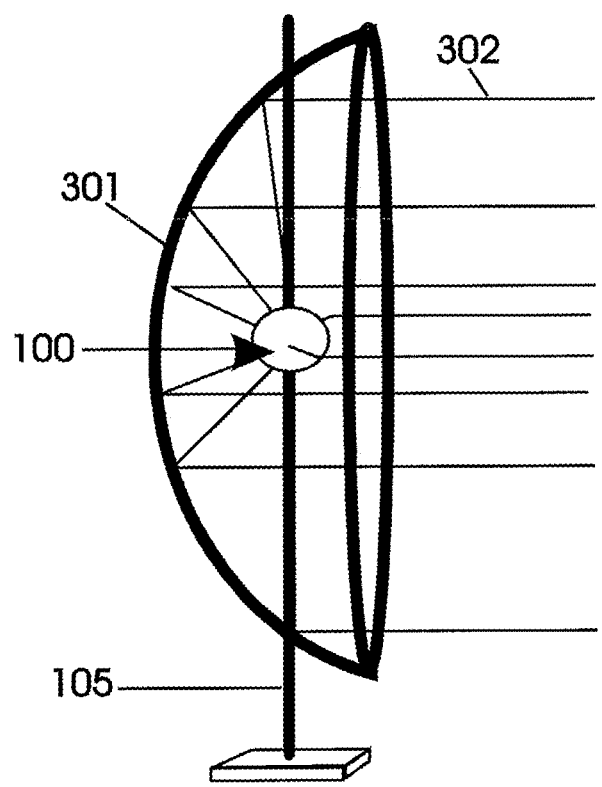
FIG. 3 is a schematic view of the spherical laser in use with a parabolic collection mirror.

In operation, the spherical laser 100 is caused to lase by exciting the gain medium 115 in the cavity 104 to meet lasing threshold conditions. The amplifying medium can be pumped optically by shining a light source into the cavity. Alternatively, an electric field can be applied between the two concentric spheres 101, 102 to excite the medium 115. The electric field can be established by applying a potential across the contact leads 109, 110, which are in turn connected to the interior cavity electrodes 106, 116. Photons generated in the cavity 104 are free to bounce back and forth between reflective surfaces 103, 114 of the inner and outer spheres. The reflective coating of the outer sphere 101 is semi-reflective, with a reflectivity of less than 100%. The outer sphere 101 thereby acts as an output coupler (OC), establishing laser light emission across the entire outer spherical surface, or at least the portion thereof not blocked by the support rod 105. Multi-wavelength operation can be achieved by utilizing a uniform gain medium having a broad emission spectrum, in conjunction with reflective coatings designed to amplify multiple wavelengths. The exiting radial laser emission can be harnessed by placing the spherical laser 100 inside a three dimensional mirror apparatus. The mirror apparatus may be a partial three-dimensional elliptical mirror 201, as shown in FIG. 2. (The ellipsoidal mirror in FIG. 2 is drawn transparently for illustrative purposes.) The spherical laser 100, supported by the rod 105 or otherwise, is positioned at a focal point of the ellipsoidal collection mirror 201, e.g., the left focal point 203. Radial emission 202 emanating from the spherical laser located at the left focal point 203 will be imaged at the right focal point 204. The ellipsoidal mirror 201 may be a partial ellipsoidal mirror, e.g., a section of an enclosed ellipsoidal mirror, or the imaged beam may be harnessed within an enclosed ellipsoidal mirror (see line 205 in FIG. 2). Typical ray traces 202 are shown for illustrating this effect. Alternatively, the spherical laser source 100 may be placed within a parabolic mirror 302, as shown in FIG. 3, for generating a columnated beam 303. The total output power is the integration of the exiting radiation across the spherical surface of the OC 101. Scalability can be achieved by increasing both R1 and R2 while maintaining a constant separation L, where L=R1–R2, as noted above. This maintains the same optical power surface density while increasing the surface area of the OC 101, thereby increasing the total output power.

The spherical laser 100 may be produced in the following manner. First, starting with high-sphericity inner and outer hollow spheres 101, 102, the outer sphere 101 is cut in half. The convex "outer" surface of the inner sphere 102 is coated with appropriate reflective coatings 114. The two hemispheres of the outer sphere 101 are precision ground and polished to prepare the concave "inner" surface for coating. The concave surfaces of the two outer hemispheres are then coated with appropriate reflective coatings 103. Holes are drilled in the inner sphere and two outer hemispheres to accommodate the support rod 105, which is used to house electrical contacts, liquid coolant ducts, and gas ducts, if required. If the inner sphere 102 is metal coated, the contact lead 110 is connected to the convex surface and fed through the support rod 105 exiting the device. (Here, the metal coating acts as a cathode-like electrical contact.) An anode-like electrical contact may be provided for the outer sphere 101 by coating the outer hemispheres with a transparent conductor, or by forming a metal wire mesh 106 to conform to the convex surfaces of the outer sphere. In such a case, the contact lead 109 is connected to the mesh or coating, and is fed through the support rod 105. The support rod 105 is placed through the inner sphere 102, the two hemispheres are positioned on the support rod to enclose the inner sphere, and any seams are sealed using a vacuum epoxy. The vessel cavity 104 is put under vacuum, and backfilled with gas or liquid amplifying media. Otherwise, the cavity is filled with the amplifying material prior to assembly of the inner sphere inside the two hemispheres. Appropriate excitation of the amplifying media will allow lasing to commence.

The spherical laser 100 utilizes a spherical resonator having two concentric, mirrored spheres 101, 102. The outer sphere 101 has a larger radius than the inner sphere 102. An amplifying medium 115 is disposed in the cavity 104 between the two spheres. The modes enclosed in such a spherical optical cavity are radial in nature. The spherical laser 100 is thereby capable of emulating a point source, with output powers scalable in conjunction with device geometry. Lasing is achieved when threshold conditions are met, and radial emission is supported through the OC (outer mirrored sphere). The spherical laser's output is scalable for a given excitation level by increasing both the inner and outer radii of the spherical mirrors, while maintaining a constant separation between the two concentric spheres. Since the distance between the inner and outer spheres is held constant (while the cavity volume is increased), the saturation conditions of the amplifying medium are not affected, thereby maintaining a constant power density at the output coupler for a given excitation level. The total output power is therefore determined by the power density multiplied by the surface area of the OC, resulting in an increase in output power for larger geometries. This effect is not possible in conventional one-dimensional laser resonators, because increasing device geometries changes the modal profile and saturation conditions of the amplifying medium, thereby altering the operating conditions.

In principle, the amplifying media housed within the spherical cavity 104 can be solid, liquid, or gas. Most active gas mediums can be used in the spherical laser. If a gas medium is used, the choice of gas medium will affect the choice of excitation means and cavity design, e.g., baffle or no-baffle. Depending upon the nature of the amplifying medium (e.g., whether atomic, ionic, or molecular), most gas lasers are excited by means of an electric discharge. As the electrons collide with the constituents of the active medium they induce transitions to higher energy levels. With sufficient pumping, population inversion is achievable. In many cases the population inversion of the amplifying medium is enhanced when the excited constituent is allowed to collide with the chamber walls, inducing non-radiative recombination and preventing a buildup in the lower excited states. Most active gas media that rely upon atomic and ionic transitions require sufficient sidewall collision rates to sustain population inversion. Atomic active media such as HeNe, noble gas active media such as Ne, and metal vapor active media including HeCd and HeSe fall in this class. For example, to insure sufficient sidewall collisions the bore radius of prior art HeNe lasers is limited to approximately 3 mm, which limits the output powers of prior art HeNe lasers to approximately 200 mW for useful length tubes.

Gas media that rely upon molecular excitation, including $CO_2$ (which relies upon molecular vibration transitions) and chemical active media (which rely upon chemical reactions, and may also be used in solid or liquid form), do not rely upon sidewall collisions to maintain population inversion. Therefore, they are good candidates for utilization in the spherical laser 100.

The emission of the spherical laser is harnessed by appropriately positioning the spherical laser 100 with respect to (i) a parabolic mirror 302 for columnated output, or (ii) an ellipsoidal mirror 201 for an imaged spot. In the case of an ellipsoidal mirror, the radial emission is imaged to a small spot whose spot size is not limited by diffraction. Thus, a major advantage of the present invention is the production of a non-diffraction limited laser spot. This is not possible for a beam focused with an optical lens. In particular, conventional lasers are focused to a small spot using optical lenses, with the focused spot size being ultimately limited to a spot on the order of one half the wavelength of emitted light as specified by the diffraction limit. Utilizing the spherical laser 100 and elliptical collection apparatus 201, infinitesimally small spot sizes are possible; the spot size is limited only by the accuracy of manufacturing, not by diffraction. Applications that would benefit from a reduced spot-size laser source include high-resolution microscopy, information storage, printing, photolithography, laser welding, drilling holes, cutting, and marking. The spherical laser 100 can also be harnessed to produce a columnated beam by enclosing it within a three dimensional mirrored parabola 302. Large spherical lasers (with radii on the order of feet) are capable of very high output powers (e.g., thousands of watts), which could be useful for military applications.

The spherical laser may utilize a gaseous amplifying medium that relies upon sidewall collisions. Typically, this requires the addition of an apparatus to enhance non-radiative recombination, for purposes of sustaining population inversion. This is due to the inherently large volume-to-surface-area ratio associated with spherical containers. To enhance non-radiative recombination within the spherical laser, a gas manifold is inserted within the spherical cavity. This increases sidewall collision centers, thereby increasing the gain of the amplifying medium. The manifold may take the form of a perforated material with radially extending holes, or it may comprise a number of spherical shells each separated by a small radial distance housing the amplifying media.

Figure 4A:
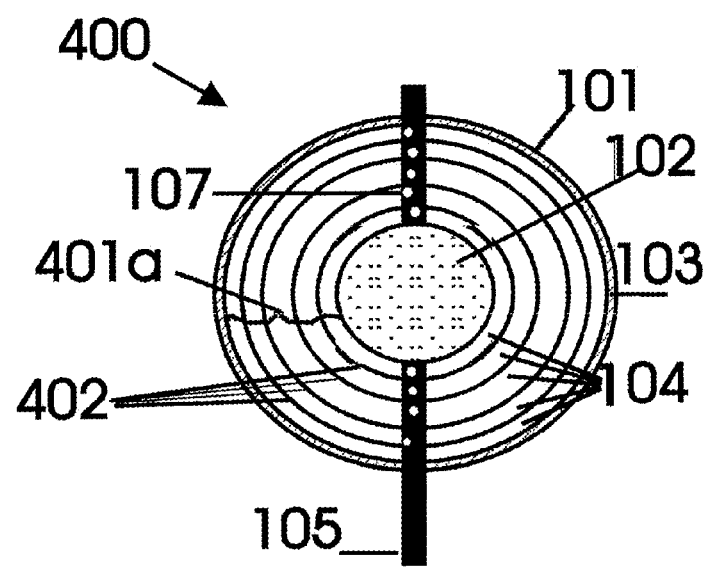
FIG. 4A is a schematic view, partially in cross section, of an embodiment of a spherical laser with a spherical shell interior gas manifold.
Figure 4B:
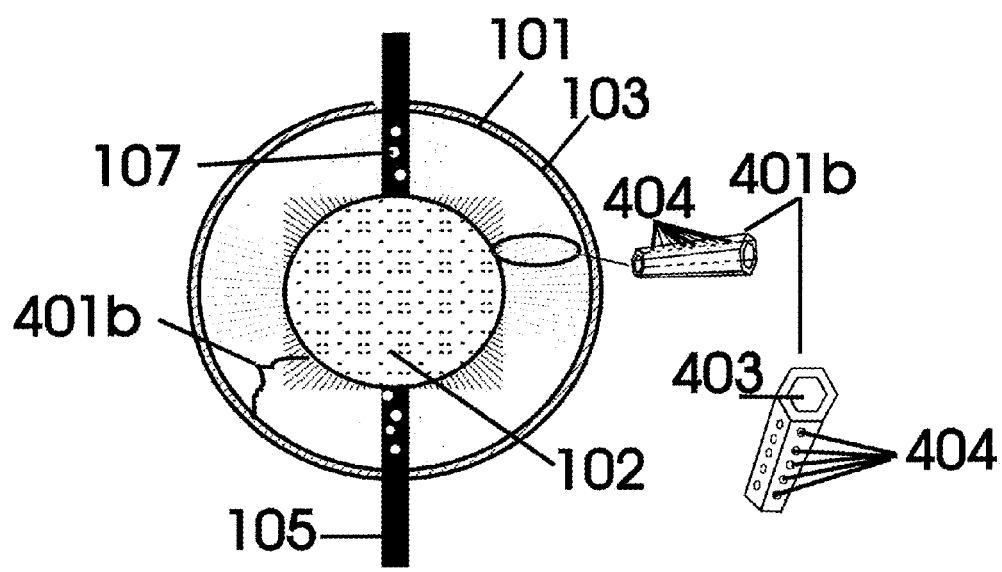
FIG. 4B is a schematic view, partially in cross section, of an embodiment of a spherical laser with a honeycombed interior gas manifold.

Embodiments of a "manifold-based" spherical laser 400 are shown in FIGS. 4A and 4B. The spherical laser 400 is generally similar to the spherical laser 100 described above, but additionally includes a gas manifold 401a or 401b. (Only the primary and/or additional elements of this embodiment are illustrated in the drawings; as implemented in practice, additional components as shown in FIGS. 1A-3 would typically be provided.) The gas manifold 401a or 401b enhances sidewall collisions, thereby allowing use of an amplifying medium that relies upon sidewall collisions to support population inversion, e.g., HeNe gas. The gas manifold may be a spherical shell manifold 401a, as shown in FIG. 4A. The spherical shell manifold 401a comprises a number of concentric shells or spheres 402 each separated by a small distance. The volume between concentric spheres is filled with amplifying media, with the proximity of the concentric shells providing ample sidewall collision sites for the active species. The shells may be made of glass, quartz, or the like. The gas manifold may also be a perforated or honeycombed manifold 401b, as shown in FIG. 4B. The perforated manifold 401b comprises a material perforated with radial holes 403 (in this case hexagonal shaped) forming tapered radial channels extending from the inner sphere 102 to the outer sphere 101. The regions between adjacent channels are also perforated with holes 404, as shown. Typically, the manifold 401b would enclose the inner sphere 102, filling the cavity 104. The advantage of the perforated manifold 401b is that it increases the surface area in which sidewall collisions may take place within the cavity 104. The material for the perforated manifold 401b may be NanoForm™ 15120 available from DSM Somos® (a high-temperature nanocomposite resin), another ceramic, ceramic-like, or composite material, or CNC-machined glass or quartz.

Operation of the manifold-based spherical laser 400 is generally the same as the operation of the spherical laser 100 shown in FIG. 1A, with the added ability of utilizing amplifying media that depend upon sidewall collisions to sustain population inversion. The shell manifold 401a is designed to maintain spherical symmetry while increasing sidewall collision sites. The spherical symmetry ensures that spherical cavity modes will be supported by the entire cavity. The overall gain of the device can be increased by adding more shells 402, assuming each shell is separated by a uniform distance. Utilizing a sufficient number of spherical shells, threshold conditions can be met and lasing supported. The perforated/honeycombed manifold 401b increases the vessel surface area, substantially increasing the gain for a given amplifying medium (e.g., one that relies upon sidewall collisions for population inversion).

Figure 5:
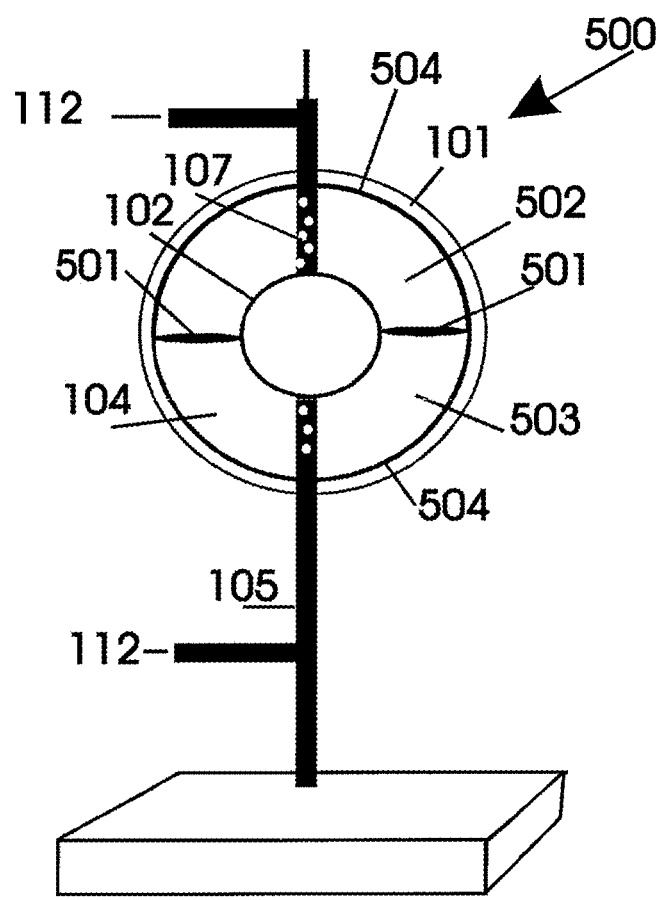
FIG. 5 is a schematic view, partially in cross section, of a multi-wavelength spherical laser, according to an additional embodiment of the present invention.

FIG. 5 shows a spherical laser 500 configured for multi-wavelength operation. (Like the manifold-based laser, only the primary and/or additional elements of this embodiment are illustrated in the drawings; as implemented in practice, additional components as shown in FIGS. 1A-3 would typically be provided.) Multi-wavelength operation is achieved by (i) housing different active mediums 502, 503 between the two spheres 101, 102, each confined to a different region/hemisphere of the spherical cavity by an isolation layer 501, or (ii) by utilizing multi-wavelength reflective coatings 504 and a single gain medium, or (iii) a combination of the two. For the former, the spherical cavity 104 is divided into different regions (2 or more) using the isolation layer 501, e.g., a ring-shaped, non-transmitting plate, thereby isolating or cordoning off the top and bottom hemispheres. One gain medium 502 is housed in one of the two isolated hemispherical cavities, and another gain medium 503 is housed in the other hemispherical cavity. The gain mediums 502, 503 support different lasing wavelengths. The semi-reflective coating 504 of the outer sphere 101 will also be different for the two hemispheres or regions. This approach can be expanded to include many different gasses, for accommodating a multitude of lasing wavelengths. Alternatively, multi-wavelength operation can also be achieved using a uniform gain medium having a broad emission spectrum, inside a non-segmented spherical cavity 104. The gain medium is used in conjunction with reflective coatings designed to amplify multiple wavelengths, or several spatially distributed, single wavelength coatings. The operation of the multi-wavelength spherical laser 500 follows the same methodology as the laser 100, but with multi-wavelength operation using wavelength-specific spherical sections and/or multi-wavelength reflective coatings.

Figure 6:
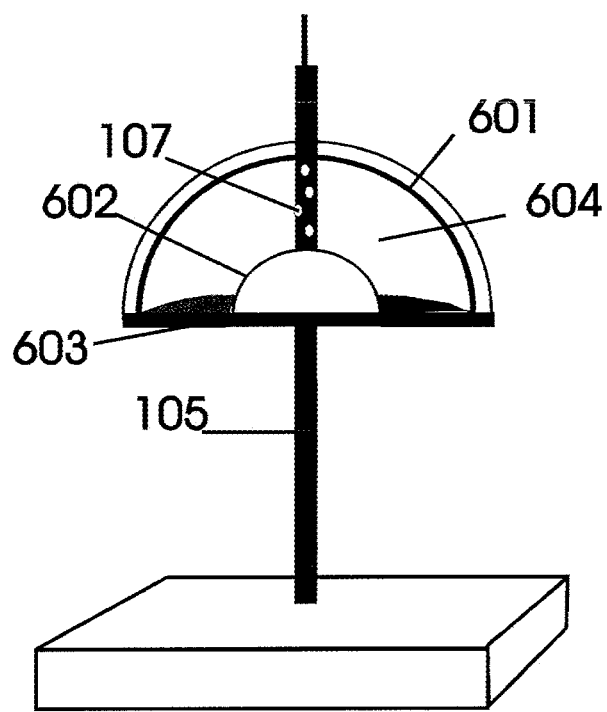
FIG. 6 is a schematic view, partially in cross section, of a hemispherical spherical laser, according to an additional embodiment of the present invention.

FIG. 6 shows a semi-spherical spherical laser 600, and more specifically a hemispherical laser. Here, instead of using complete spheres, the laser 600 uses inner and outer generally spherical vessels 601, 602, respectively, that are hemispherical in shape. In effect, the hemispherical spherical laser is one half of the spherical laser 100, designed to lase in only one hemisphere. (Again, only the primary and/or additional elements of this embodiment are illustrated in the drawings; as implemented in practice, additional components as shown in FIGS. 1A-3 would typically be provided.) The hemispherical laser 600 includes the inner 602 and outer 601 hemispherical vessels, each possessing both mirrored and conducting surfaces similar to the spherical laser 100 shown in FIG. 1A. This arrangement establishes a hemispherical cavity housing the gain medium 604. A base plane 603 separates the inner and outer hemispheres and provides electrical isolation, if required. The base 603 may be cooled to assist in heat dissipation. The operation of the hemispherical spherical laser follows the same principle and scalability as the spherical laser of FIG. 1A, with the exception of lasing only out of the upper hemisphere. As noted, instead of being specifically hemispherical in shape, the vessels 601, 602 may be semi-spherical in shape, e.g., a radial section of a sphere.

Figure 7:
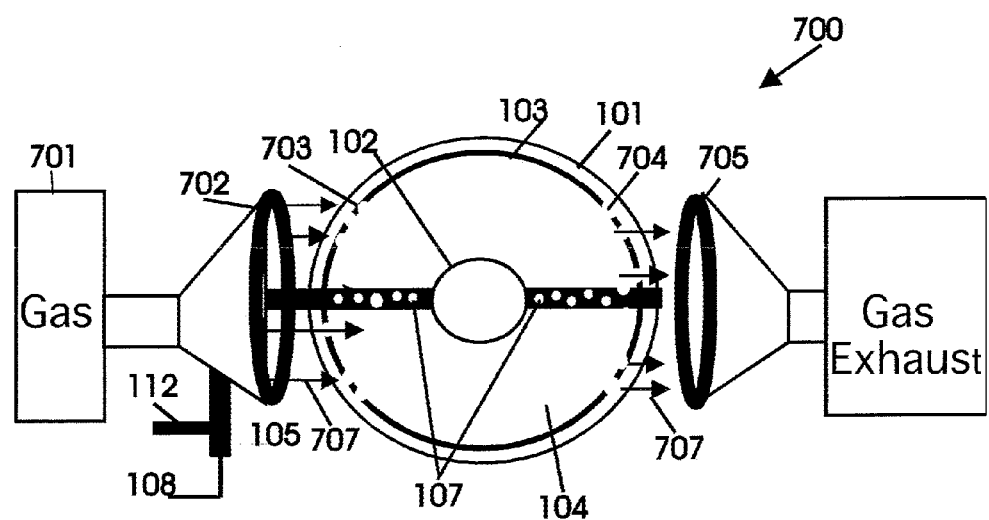
FIG. 7 is a schematic view, partially in cross section, of a spherical laser using a chemically active gain medium, according to an additional embodiment of the present invention.

An additional embodiment of the present invention relates to a spherical laser 700 utilizing a chemically active amplifying medium, as shown in FIG. 7. Again, many of the components would be same as shown and described above with respect to the laser 100 shown in FIG. 1A. For use with a continuous-flow, chemically active amplifying medium, a gas source 701 (storing a first gas 707) feeds a nozzle 702 configured to accelerate the first gas 707 and aim the gas 707 through entrance holes 703 into the spherical cavity 104. The cavity 104 is filled with a complementary gas utilizing the duct 112 and entrance holes 107. The two gases react chemically to generate an amplifying media. The gas flow is directed out exit holes 704 into a collection nozzle 705 and scrubber 706. If the chemical reaction requires optical stimulation, windows in the OC reflective coating 103 will allow entrance of pumping photons. Operation of the laser 700 is generally similar to the operation of the laser 100 in FIG. 1A, but without the need for electrical contacts and contact leads.

As noted, photons generated in the cavity 104 are free to bounce back and forth between the spheres 101, 102. The outer sphere 101 with its semi-reflective coating 103 (reflectivity less than 100%) acts as the exit mirror, whereby laser light exits through the entire outer spherical surface. The exiting laser radiation is collected using an outside mirror apparatus. As noted, the mirror apparatus may be an ellipsoidal mirror 201 or a parabolic mirror 302. However, the present invention is not limited to these two specific examples. Any reflecting surface can act as an integrator to some degree of success.

The choice of R1, R2, and L dictate whether the resonant cavity is stable or unstable, single or multiple longitudinal modes, and the optical power surface density existing at the outside of the outer sphere. The outer sphere radius R1, the inner sphere radius R2, and the cavity length L can be chosen to establish either a stable or unstable resonator, depending upon the L/R2 ratio. The total output power is the integration of the exiting surface optical power density across the outer spherical surface. Scalability is achieved by increasing both R1 and R2 while maintaining a constant R1/R2 ratio and cavity length. As noted, this maintains the same optical power surface density while increasing the total optical output power associated with a larger emitting surface area.

Figure 8A:
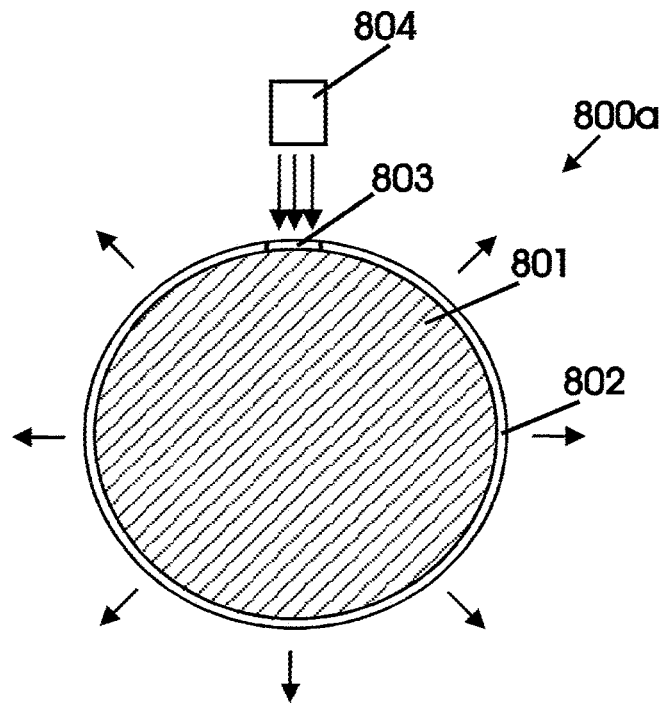
FIGS. 8A and 8B are schematic cross-sectional views of single-sphere lasers according to additional embodiments of the present invention.
Figure 8B:
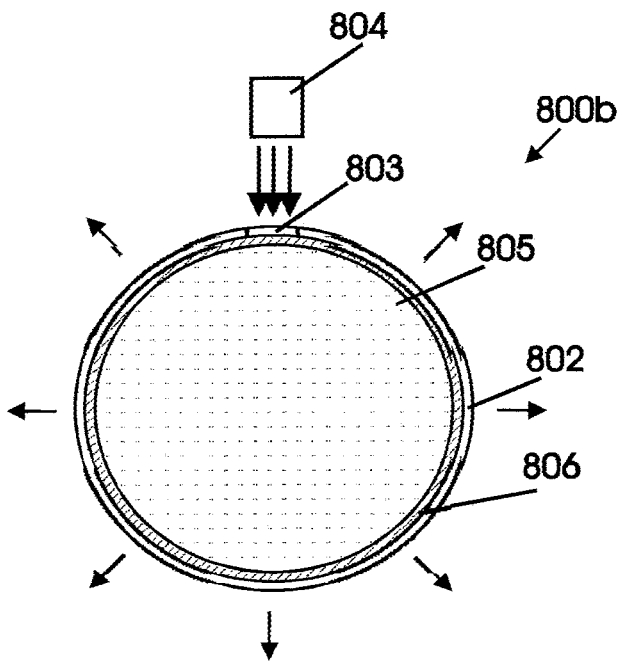

Although the spherical laser has been generally illustrated as having inner and outer spherical vessels, a single sphere could instead be used in conjunction with an optically active medium. (As should be appreciated, no inner sphere is needed because the optically active medium is not electrically excited, and therefore does not require an interior cathode-like contact for applying an electric field.) Examples are shown in FIGS. 8A and 8B. In FIG. 8A, a spherical laser 800$a$ includes a solid spherical body 801 and a reflective coating 802. The sphere 801 is made of a doped glass that is optically excitable, e.g., the doped glass acts as an optically amplifying medium. A window 803 in the reflective coating can be utilized to admit optical stimulation for exciting the doped-glass amplifying medium. More particularly, the reflective coating 802 is semi-reflective at the lasing wavelengths, while the window 803 is transparent to the wavelength of optical stimulation. The window may be physical, e.g., a break in the coating, or it may be chemically/compositionally produced, e.g., a portion of the coating is made of a different or varying material or composition configured to admit the stimulation radiation wavelength(s). With ample optical stimulation, the laser 800$a$ will lase, emitting a spherical mode or modes at a wavelength specified by the optically active doped glass. The doped glass, for example, may be neodymium-doped yttrium vanadate ($Nd^{3+}$:$YVO4$) glass/crystal. Such glass would be pumped with 808 nm laser diodes 804, for emissions in the red, blue, green, or infrared wavelengths, all of which are excellent for microscopy of living cells. For manufacturing, doped glass would be formed into a sphere using a sphere machine. The sphere would then be coated with either a metal or dielectric semi-reflective coating, appropriately configured for inclusion of a window 803.

In FIG. 8B, a spherical laser 800$b$ is generally similar to the spherical laser 800$a$. However, the optically active amplifying medium 805 is housed in a spherical vessel (e.g., made of quartz, glass, or other substrate material) 806 having an interior cavity. The coating 802 may be disposed either on the inside or outside of the spherical vessel 806. The laser 800$b$ would be manufactured in a manner similar to as described above with regards to the laser 100 in FIG. 1A, e.g., a spherical vessel is bisected, filled with the amplifying medium, resealed, and so on. Alternatively, a small hole could be cut in the vessel, with the medium 805 being poured in, e.g., in liquid, molten solid, powder, or other at least temporarily flowable form. For a molten solid, differences in shrinkage between the melted solid and vessel 806 would typically be taken into account, and the materials would be allowed to slowly cool. It should be noted that the optically active medium does not have to fill the entirety of the cavity, or be uniform. For example, a piece or lump of material in the cavity would still feed the spherical modes of the cavity, upon optical stimulation.

An embodiment of the present invention relates to a mode tailored spherical laser apparatus. The laser apparatus utilizes a spherical resonator comprising of a single spherical resonator or a pair of concentric spherical mirrored surfaces forming a spherical shell resonator housing an optically active media, the cavity also includes regions of media differing in bulk optical properties (refractive index, scattering coefficient, absorption coefficient, anisotropy and optical gain) from the active media (these regions are referred to as optically different regions) the optically different regions function to mode tailor the cavity excluding degenerate modes. The single sphere laser is comprised of an optically active glass (or crystal) ground and polished into a sphere (or spherical shell) and coated with an appropriate reflective coating. Optically different regions are produced by forming narrow strips of damaged media (breaking up the glass or crystal) encircling the sphere (similar in arrangement to the lines encircling a soccer ball)—these regions of high scattering, low gain and high optical loss deter the onset of whispering gallery modes. When the spherical crystal is adequately pumped with an external optical source (comprising of an photonic source, i.e., diodes, flashlamp, light traveling down a fiber but coupled to the sphere etc) it will lase and produce a three-dimensional radially diverging laser beam, thereby emulating a point source.

Utilization of a gas active media requires use of the concentric spherical resonator with the inclusion of an anode and cathode to establish an electric field utilized to excite the gas media. The complexity of the concentric spherical cavity depends upon the mechanisms of achieving gain within a particular gas media. Most gas lasers are excited by means of an electric discharge and many rely upon gas/chamber collisions to maintain population inversion. As the electrons collide with the constituents of the active medium they induce transitions to higher energy levels. With sufficient pumping population inversion is achievable. In many cases the population inversion of the amplifying medium is enhanced when the excited constituent is allowed to collide with the chamber walls inducing non-radiative recombination preventing a buildup in the lower excited states. Most active gas media relying upon atomic and ionic transitions require sufficient sidewall collision rates to sustain population inversion. Atomic active media such as HeNe, nobel gas active media such as Ne, metal vapor active media including HeCd and HeSe fall in this class. For example, to insure sufficient sidewall collisions the bore radius of HeNe lasers is limited to approximately 3 mm, this limits the output powers of HeNe lasers to approximately 200 mW for useful length tubes.

Gas media relying upon molecular excitation including $CO_2$ (which relies upon molecular vibration transitions) and chemical active media (which may also be used in solid or liquid form, rely upon chemical reactions), do not rely upon sidewall collisions to maintain population inversion are therefore good candidates for utilization the spherical laser presented.

To utilize a gas amplifying medium which relies upon sidewall collisions to maintain positive gain for a spherical laser requires the addition of an apparatus to enhance non-radiative recombination to sustain population inversion. This is due to the inherent large volume to surface area ratio associated with spherical resonators. To enhance non-radiative recombination within the spherical laser, a gas manifold (consisting of a physical apparatus to increase the likelihood of sidewall collisions) is inserted within the spherical cavity which increases sidewall collision centers thereby increasing the gain of the amplifying medium, in addition the gas manifold can be accompanied by an optically different region or provide mode tailoring itself. The form of the manifold can consist of a perforated material with holes extending radially or as spherical shells each separated by a small radial distance housing the amplifying media.

The three dimensional spherical laser emission is harnessed by enclosing the spherical laser in a parabolic (for columnated output) or ellipsoidal (for imaged spot) three dimensional mirror to image the laser emission. Utilizing an ellipsoidal mirror the radial emission is imaged to a small spot whose spot size is non-diffraction limited. Thus, a major advantage of this invention is the production of a non-diffraction limited laser spot (not true for a beam focused with an optical lens). Conventional lasers are focused to a small spot by optical lenses; the focused spot size is ultimately limited to a spot on the order of one half the wavelength of emitted light as specified by the diffraction limit. Utilizing the spherical laser and elliptical collection apparatus, infinitesimally small spot sizes are achievable, the spot size is limited by manufacturing tolerances.

Applications that would benefit from a reduced spot-size laser source include: high resolution microscopy, information storage, laser printing, photolithography, laser welding, hole drilling, cutting and marking. The spherical laser can also be harnessed to produce a columnated beam by enclosing it within a three dimensional mirrored parabola. Large concentric spherical lasers (with radii on the order of feet) are capable of very high output powers (thousands of watts), which could be useful for military and communication applications.

Figure 9:
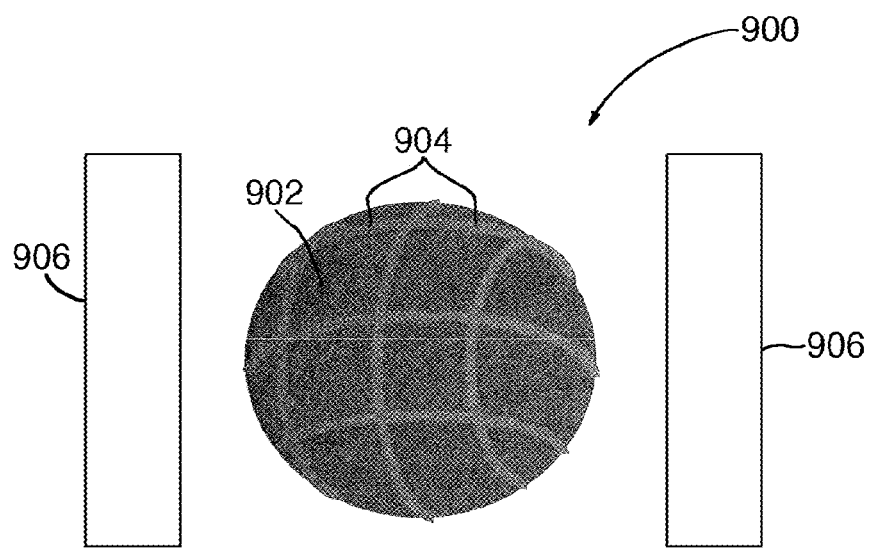
FIG. 9 illustrates spherical laser according to an embodiment of the present invention.

In still another embodiment, a mode tailored spherical laser 900 is shown in FIG. 9. The mode tailored laser 900 has a solid sphere 902 with optically different regions 904 (stripes of alternate optical parameters extend diametrically about the solid sphere 902 to deter whispering gallery modes. The optically different regions 904 act as an obstruction in the optical path of a given whispering gallery mode. Whispering gallery modes are modes that utilize total internal reflection to complete a round trip. A 360-degree trajectory is mandatory for the formation of whispering gallery modes.

In general the spherical cavity supports two sets of modes, the normal set of modes supporting characteristic frequencies (known as structural resonances) and a degenerate or non-normal set of modes called whispering gallery modes (degenerate in frequency). The whispering gallery modes propagate along the spherical surface around the azimuth. The optically different regions work collectively to exclude the whispering gallery modes from those supported by the spherical cavity.

Excitation of an amplifying medium produces optical gain, when the optical gain exceeds cavity losses, threshold conditions are met and lasing is supported. Output power is proportional to the power density and the radius of the outer sphere. The concentric spherical laser design is scalable in output power. Increasing both spherical radii (inner and outer) of the concentric spherical resonator while maintaining a constant radial cavity length, the surface area of the outer sphere is increased while the radial power density is unchanged, thus the total output power is increased for a constant radial power density. The spherical laser's output is radially diverging, (emulating a point source) and can be harnessed by enclosing the spherical laser apparatus within a mirrored ellipse to image the output emission to a point or imaged to a columnated beam when enclosed within a mirrored parabola.

Total internal reflection refers to the condition which a light ray experiences a glancing angle off a reflecting surface, in this situation 100% of the light is reflected back into the original media. As the angle of incidence increases, exceeding the total internal reflection angle, a portion of the light wave is transmitted into the outside media effectively increasing a mirror loss. When the mirror loss is too great with respect to available gain provided by the excitation state and active properties of the amplifying media, the mode can no longer reach threshold and is effectively cut off.

Figure 16:
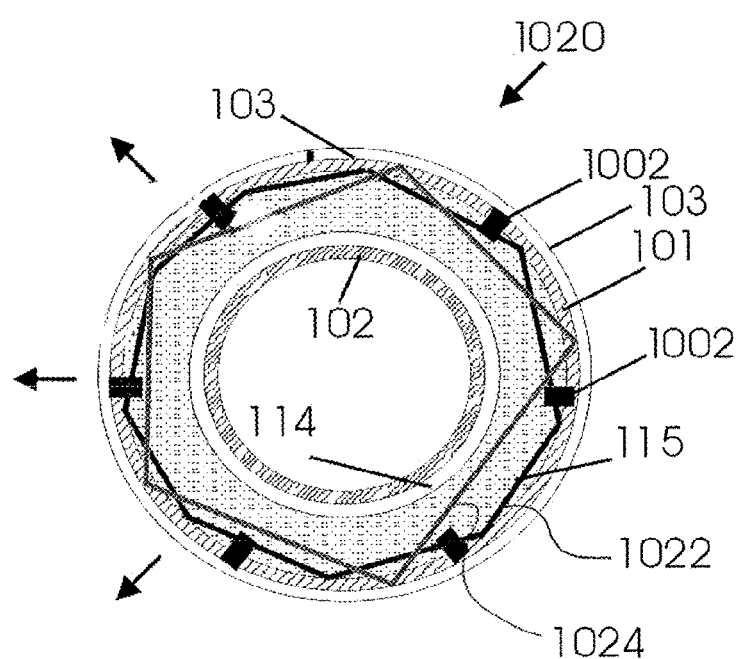
FIG. 16 illustrates spherical laser according to an embodiment of the present invention.

With additional reference to FIG. 16, unobstructed whispering gallery modes are free to run. This mode typically is the lowest threshold mode and turns on first. Once on, the mode eats the majority of the available gain in its overlap path depriving other modes competing for the same gain. The uneaten gain is free for other modes, most probably whispering gallery modes, to take advantage of.

Whispering gallery modes are more probable to lase over radial modes of the spherical shell resonator as a result of the gain/loss mechanisms at play. The radial mode has a short cavity length, equal to the sphere shell thickness, the gain of the radial mode is exponentially related to the cavity length $G \sim \exp(gl)$ where g is the material gain and l is the cavity length. As the radial mode bounces back and forth between the two mirrors, outside sphere to inside sphere, the radial mode also experiences two mirror losses per trip. A whispering gallery modes path experiences more mirror reflections, but due to total internal reflection there is no loss associated with these reflections, so the whispering gallery modes experiences appreciably more gain and turns on before the radial mode can reach threshold. Once on the whispering gallery mode or whispering gallery modes eat the available gain, so that the gain is no longer available to the other modes, effectively shutting off the radial mode.

Therefore, the whispering gallery modes can be cut-off by increasing their loss term or breaking their path by the use of optically different regions 1002. The light ray of the whispering gallery modes cannot complete a round trip, and therefore, cannot satisfy the phase condition, or the ray can complete the round trip, but with increased loss and therefore cannot satisfy the gain condition. Without the whispering gallery modes gain is left for other modes to run. Since the spherical cavity houses both whispering gallery modes and spherical modes, the spherical modes are next in line to receive the gain.

Figure 10:
FIG. 10 illustrates spherical laser according to an embodiment of the present invention.

As disclosed, the mode tailored spherical laser 900 is photonically excited by external photonic sources or flash lamps 906. However, the mode tailored spherical laser 900 may also be excited by other means that depend upon the type of amplifying medium used to make the solid sphere 902, as discussed above. As shown in FIG. 10, the mode tailored spherical laser 900 may also be excited by a fiber optic wire 908.

Embodiments of another mode tailored spherical laser 1000 is shown in FIG. 11. The mode tailored spherical laser 1000 is generally similar to the spherical laser 100 described above, but additionally includes a plurality of optically different regions 1002 extending diametrically about and between the two spheres 102 and 103.

A single mode tailored sphere design is applicable for optically active gain media and does not support output power scalability. It does have the advantage of being less complex than the concentric spherical resonator design and is relatively simple to manufacture. The concentric mode tailored spherical resonator design although more complicated in apparatus is scalable and is applicable as a mode converter or laser when an optically active medium is employed under proper excitation. Both mode tailored spherical laser designs produce radially diverging three dimensional laser beams. The object of the mode tailored spherical laser is to provide a laser capable of emulating a point source (supporting spherical radial modes) with scalable output powers with device geometry.

The mode tailored spherical optical cavity, utilizing optically different regions to cutoff whispering gallery modes, and supports radial modes and therefore emulates a point source when operated as a mode converter or laser. For the laser structure, lasing is achieved when the threshold conditions (gain is equal to loss, round trip gain is preserved—similar to conventional lasers) are met and radial emission is supported through the output coupler (smaller reflectance mirrored sphere—ether outward or inward directed). The concentric mode tailored spherical laser's output is scalable for a given excitation level by increasing both the inner and outer radii of the spherical mirrors while maintaining a constant radial cavity length (separation between the two concentric spheres). Since the distance between the inner and outer sphere is held constant (while the cavity volume is increased) the saturation conditions of the amplifying medium are not affected by scaling, thus maintaining a constant radial power density at the output coupler for a given excitation level. The total output power is therefore determined by the power density multiplied by the surface area of the OC, resulting in an increase in output power for larger geometries. This effect is limited in conventional one dimensional laser resonators for increasing geometries alter the modal profile and saturation conditions of the amplifying medium thus altering the operating conditions. In principle the amplifying media housed within the spherical cavity can be solid, liquid or gas.

In operation, proper excitation of at least one optical mode supported by the spherical resonator housing a spherical active media will meet threshold conditions (gain=loss), with subsequent pumping (i.e. increase in excitation level) lasing will occur (as in a standard laser). Regions of the optical cavity are designated as optical gain regions or optical attenuation regions (characterized by absorption, scattering, or the mere absence of optical gain), by incorporating within an optical cavity otherwise comprising of an optical gain media a series of optical attenuation members comprising multiply-defined media regions, which may take the form of, e.g., stripes encircling the spherical vessel, a spherical shell layer and/or by spatially selective excitation, so that the confinement factor (volumetric portion of optical resonator mode overlapping with optical gain media) of the radial mode is tailored to favor radial mode operation, thus excluding other resonator supported modes of operation including whispering gallery modes.

The spherical shell configuration the reflective coatings can be designed to favor internal or external emission. Internal emission will establish a high density point source located at the center of the sphere. External emission will exit the outer sphere diverging radially. The diverging beam of the external emission can be harnessed through the utilization of 3-D mirrored surfaces, parabola for collimation, ellipse for imaging to a point or variation to direct the point source to a specific location. The 3-D imaging device could be comprised of a plurality of surfaces all with individual positioning capabilities for real-time adjustment of point source location, adaptive optics configuration.

Another embodiment of a mode tailored spherical laser 1010 is shown in FIG. 11. The mode tailored spherical laser 1010 is generally similar to the mode tailored spherical laser 1000 described above, but a solid state media or active media 115 itself is the structure of the spherical shell resonator and optical mirrors are deposited directly on the solid state media 115, with outer wavelength specific mirror 103 and inner reflective mirror 104.

Photonic excitation, incident upon either the inner or outer spherical surface, is possible through one of the mirrors being tailored to transmit the pump wavelength while partially reflecting the lasing wavelength. The second mirror will be tailored to partially reflect the lasing wavelength. The output direction will be determined by offsetting one of the mirrors to support a lower value of reflectivity at the lasing wavelength. The laser can be configured to output photonic radiation either radially outward or radially inward.

Figure 14:
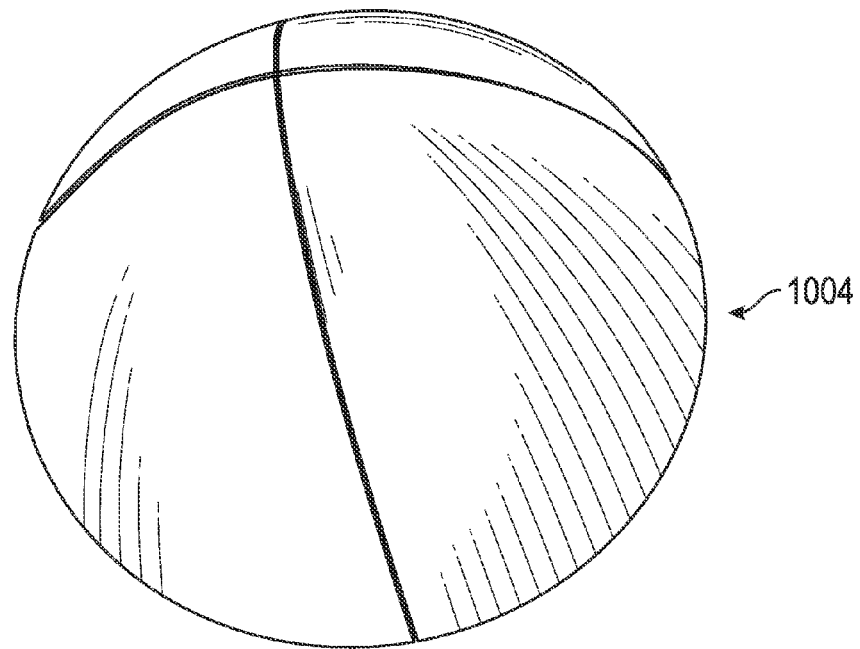
FIG. 14 illustrates a hemispheric compilation of shells of a spherical laser according to an embodiment of the present invention.
Figure 15:
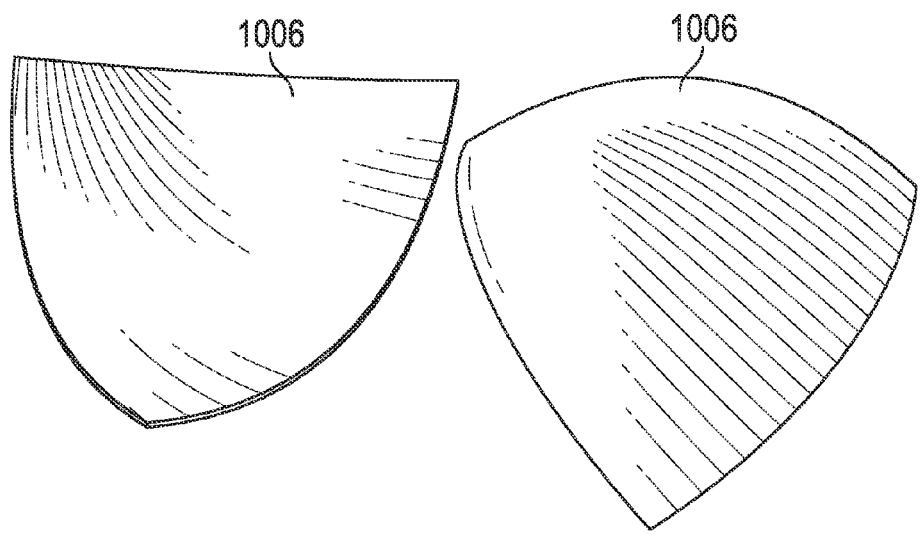
FIG. 15 illustrates shells of a spherical laser according to the embodiment of FIG. 14.

With additional reference to FIGS. 13 and 14, the solid state media 115 is a shell 1004 that is assembled in sections of spherical polyhedron shells 1006 and assembled into a complete spherical vessel, which may be other than a complete sphere. The glue or frit or adhesive used to bind together the individual polyhedrons act as optically different regions 1002 to whispering gallery modes running around the spherical vessel. By proper design of the optically different regions 1002, whispering gallery modes are extinguished favoring radial mode operation.

As disclosed, whispering gallery modes are extinguished as they propagate through optically different regions 1002, which result from the manufacturing process of assembling the final spherical geometry from a plurality of spherical polyhedron shells 1006. The optically different regions 1002 result from adhesive used to bind the sections forming a whole vessel. Alternatively, the optically different regions 1002 may arise from processes performed on a complete uniform gain shell for thin regions of material with differing optical performance characteristics (turbidity, absorption, reflection, polarization or excitation orientation) all acting to favor radial emission of the spherical shell laser.

The optically different regions 1002 are realized by processing uniform gain media to form regions of differing optical performance from that of the active media 115. The processing of optically different regions may involve proton bombardment, smashing up of the solid material forming polycrystalline regions or removal and replacement with an alternative material to that of the active media. The replacement material may be any material with differing optical performance from that of the optical media. The operation of the mode tailored spherical laser 1010 follows the same principle and scalability as the spherical laser 100 with the exception of pertaining only to solid state active media which allows for the elimination of a separate spherical vessel to house the active media.

Another embodiment of a mode tailored spherical laser 1020 is shown in FIG. 16. The mode tailored spherical laser 1020 is generally similar to the mode tailored spherical laser 1000 described above, but optically different regions 1002 extend only partially into the solid state media 115 and diametrically about the outer sphere 103.

The solid state optical media 115 is excited by photons from excitation light sources 1026. The blocked whispering gallery modes trajectory 1022 is effectively blocked by the optically different regions 1002, and the unblocked whispering gallery modes trajectory 1024 is free to run. The depth of the optically different regions 1002 is related to the allowed angle of incidence of rays that are not obstructed by the optically different regions 1002. The deeper the optically different regions extends into the sphere the higher the angle of incidence required of a whispering gallery modes to avoid the optically different regions. As can be seen in the figure the angle of incidence for blocked whispering gallery modes trajectory 1022 is smaller than the unblocked whispering gallery modes trajectory 1024. As the angle of incidence increases eventually the rays will not experience total internal reflections and additional losses will be incurred upon each reflection, the addition loss takes on the form of transmittance and a portion of the beam exits the sphere, as the optically different regions are extended either the round trip path will no longer be available or the mirror loss will overpower the round trip gain and the mode will not make it to threshold. The optically different regions can be effective even if they do not extend through the entire active region.

Figure 17:
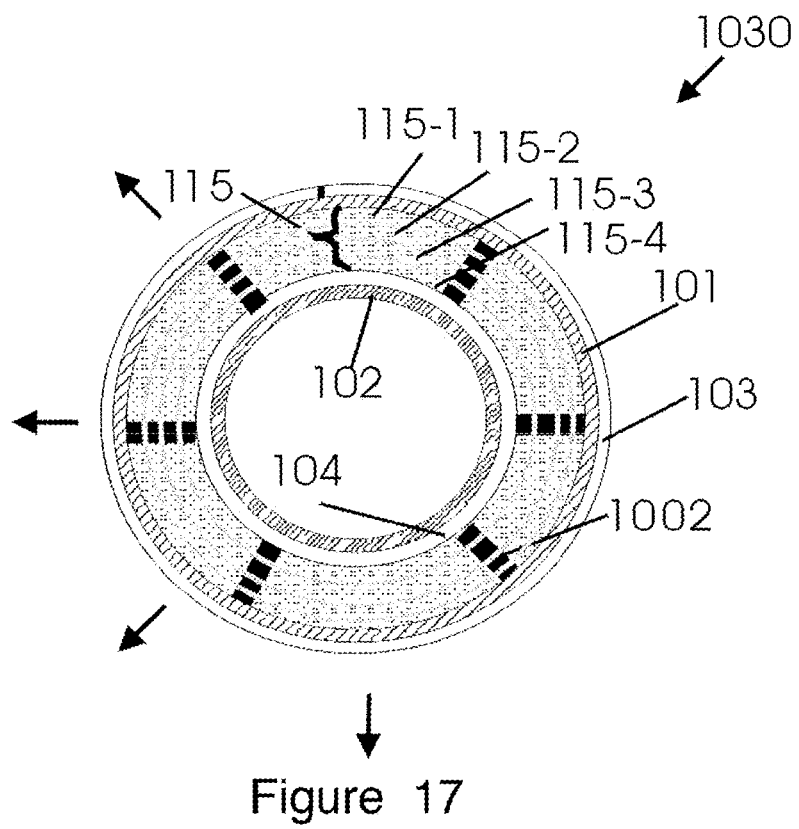
FIG. 17 illustrates spherical laser according to an embodiment of the present invention.

Another embodiment of a mode tailored spherical laser 1030 is shown in FIG. 17, which utilizes a concentric spherical resonator. The apparatus consists of two concentric spherical vessels with outer spherical shell 101 of radius R1 greater than that of the radius R2 of the inner spherical shell 102 (R1>R2). The concentric spherical shells may consist of glass, quartz, dielectric or other suitable substrate material acting as a rigid body capable of housing an optical media within the cavity 104.

One or more surfaces (outer or inner or both) are optically coated with a semi-transparent reflective coating 103. The reflective coatings can be designed for laser emission external (Reflectivity of outer sphere less than the Reflectivity of Inner sphere) or internal emission (Reflectivity of inner sphere less than the Reflectivity of the outer sphere) or equally (equal Reflectivity of both mirrors). The reflective coatings may consist of ether metal coating or multi-layered dielectric coatings. Housed within the concentric spheres is an optical media 115 (comprising of a single or multiple layers 115-1, 115-2, 115-3, 115-4) the optical media being optically active (capable of generating photons upon proper excitation), forming a spherical resonator. The optical media may be a gas, liquid, solid or chemical composition, and may contain a single or multiple of layers or regions.

Figure 18:
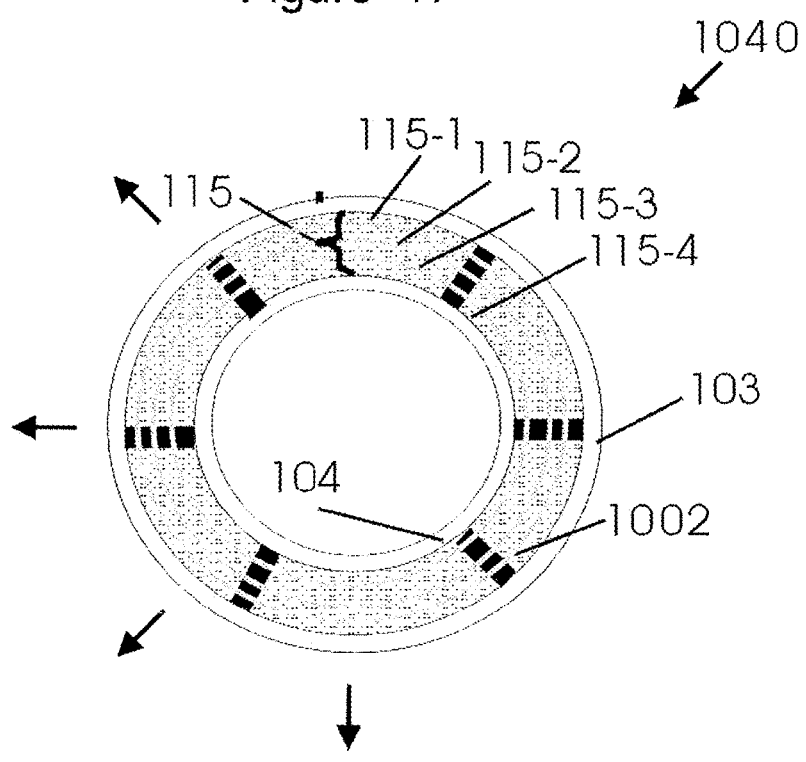
FIG. 18 illustrates spherical laser according to an embodiment of the present invention.
Figure 19:
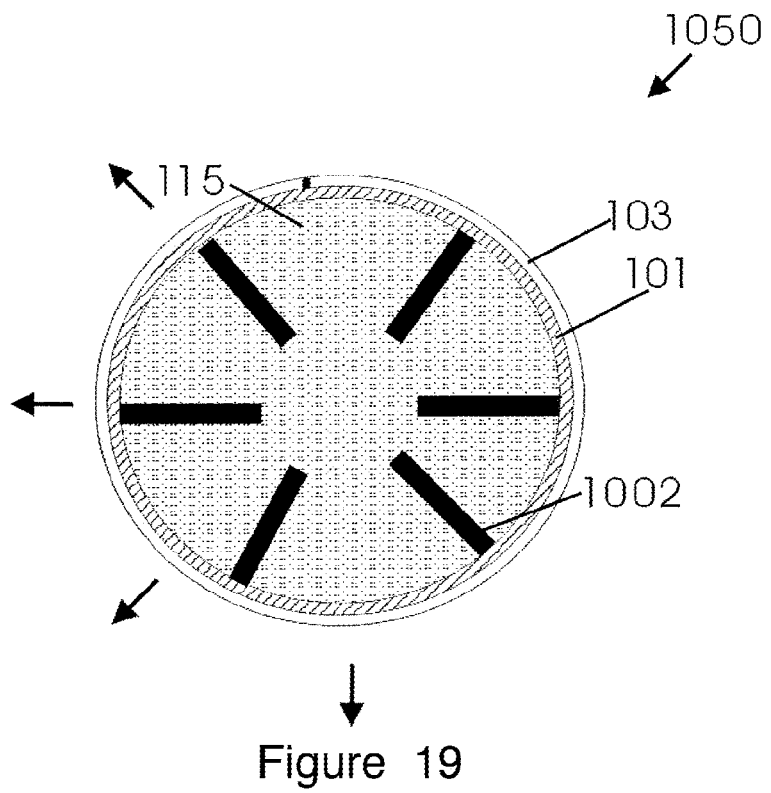
FIG. 19 illustrates spherical laser according to an embodiment of the present invention.
Figure 20:
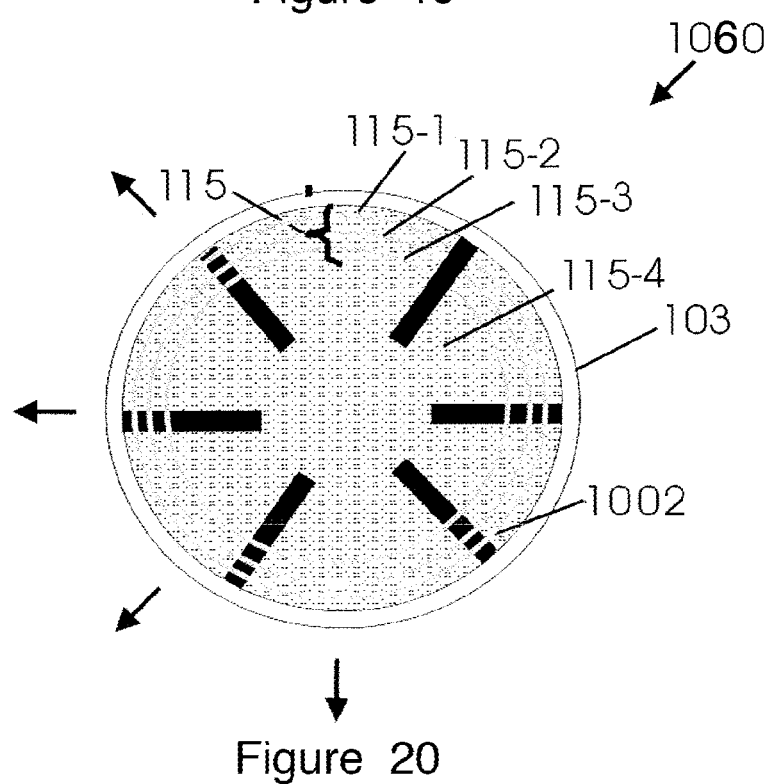
FIG. 20 illustrates spherical laser according to an embodiment of the present invention.

When the active media 115 is comprised of a solid (glass, dielectric or crystal) the media itself may serve as the housing and optical coatings can be deposited directly on the optical media (on any or all of the layers comprising 115. i.e. 115-1, 115-2, 115-3, 115-4, on ether the inner or outer surface as well) to form the spherical resonator 1040 of FIG. 18. As shown, only the outer surface of the top layer and the inner surface of the inner layer are mirrored. Alternatively the spherical resonator can be comprised of a single sphere, using a separated spherical shell vessel to house the cavity media as depicted in FIG. 1C or utilizing the active media itself as the spherical vessel as depicted in FIG. 20. The spherical resonator includes an optical gain media with a plurality of defined optical attenuation members 1002 containing alternative optical media from the cavity medium differing in bulk optical parameters (e.g., reflective interface, conductance, transmittance, morphology, refractive index, scattering coefficient, absorption coefficient and/or optical gain) utilized for mode tailoring.

A method of producing the spherical resonator discussed herein below. First, starting with a sphere of solid state laser the sphere is cut into two hemispheres, both hemispheres are homed out to produce two hemispherical shells of thickness pertaining to the cavity length of the spherical resonator. The inner spherical surface is coated with a dielectric semi-reflective mirror designed to reflect the lasing wavelength.

The two hemispherical shells are aligned and assembled (utilizing epoxy or glass frit or other suitable adhesion method) into a complete sphere. At this point, the outer sphere is reshaped by utilizing a sphere machine to grind and polish the outside surface. The outside surface is coated with a semi-reflective mirror (if the excitation is to exit the laser the outer surface will have a reflectance at the lasing wavelength smaller than that of the inner spherical mirror).

The optically different region is made by masking off striped sections of the outer spherical surface (similar in design to that of stripes on a soccer ball) and utilize an appropriate procedure to smash up the glass in these regions, alternatively the media in these regions is etched away and replaced with an alternative media, or the media in these regions could be atomically doped to alter the gain coefficient or absorption coefficient). The effect of the optically different region is to extinguish whispering gallery modes upon excitation of the spherical cavity. Appropriate excitation of the amplifying media will allow lasing to commence.

In operation, exciting the optically active media 115 housed in the spherical resonator photons are generated inside the spherical cavity. Due to the mirrored surfaces 103 photons are free to bounce back and forth between the concentric spherical mirrors traversing the cavity upon each pass. Upon sufficient excitation stimulation emission occurs and lasing will result when threshold conditions are met. The optical mirrors 103 are designed to allow entrance of the excitation (or pump) photons while semi-reflecting lasing wavelength photons. The spherical laser is configured to emit light externally or internally, for external emission (Reflectivity of outer sphere less than the Reflectivity of Inner sphere) or internal emission (Reflectivity of inner sphere less than the Reflectivity of the outer sphere) or equally (equal Reflectivity of both mirrors)

Figure 21:
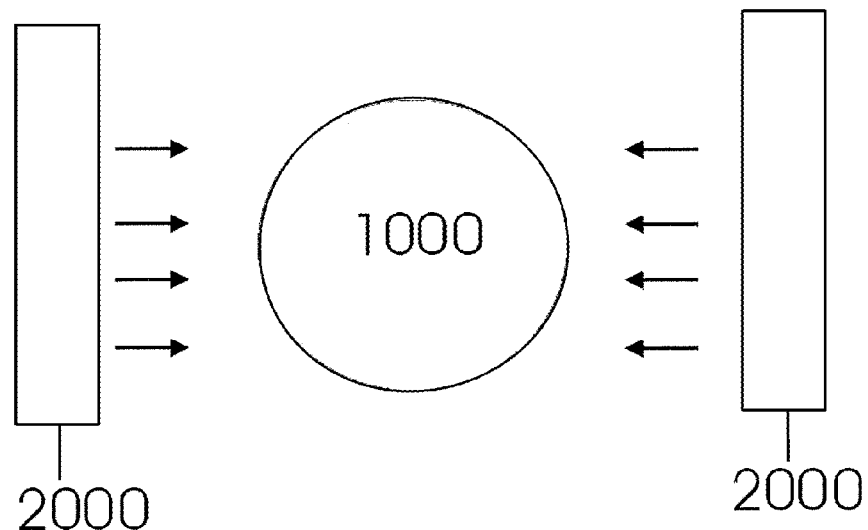
FIG. 21 illustrates excitation of a spherical laser according to an embodiment of the present invention.
Figure 22:
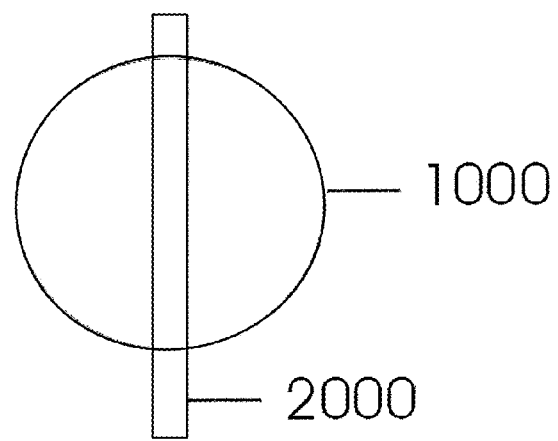
FIG. 22 illustrates excitation of a spherical laser according to an embodiment of the present invention.
Figure 23:
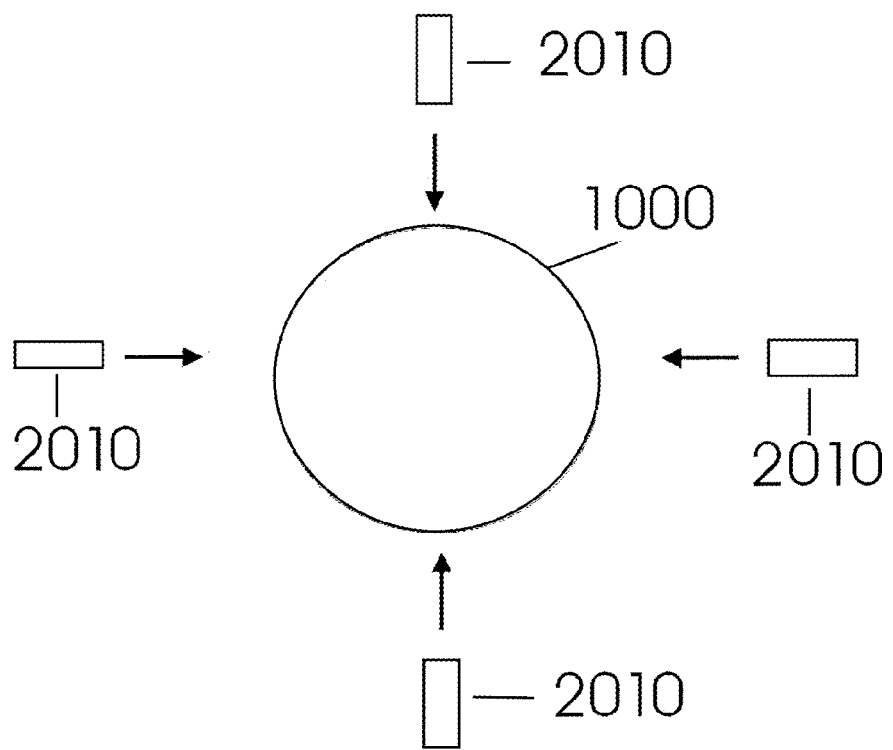
FIG. 23 illustrates excitation of a spherical laser according to an embodiment of the present invention.
Figure 24:
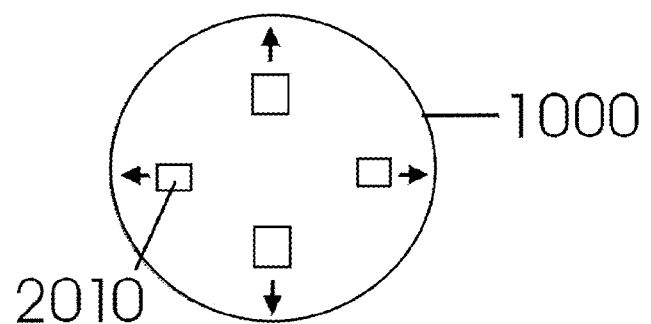
FIG. 24 illustrates excitation of a spherical laser according to an embodiment of the present invention.
Figure 25:
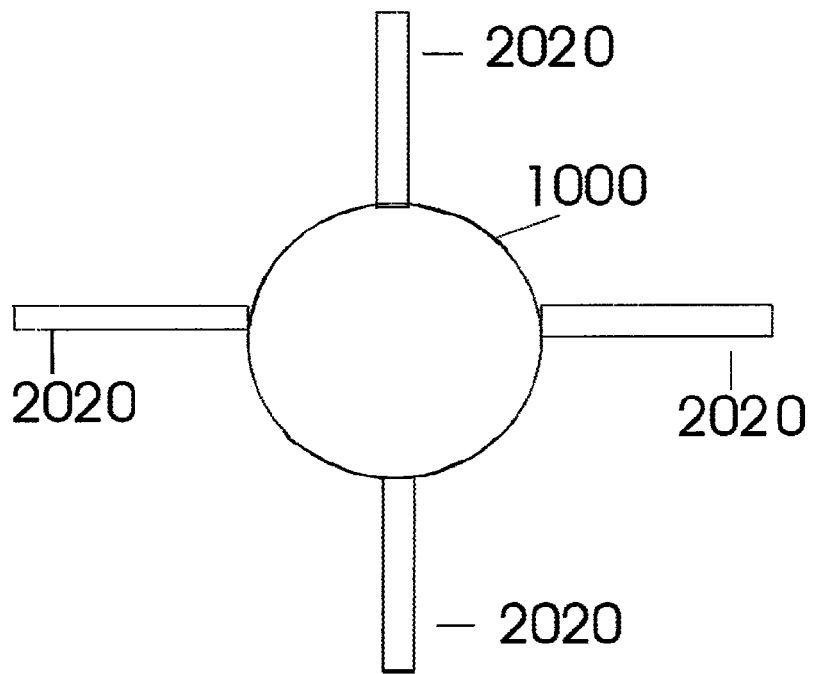
FIG. 25 illustrates excitation of a spherical laser according to an embodiment of the present invention.
Figure 26:
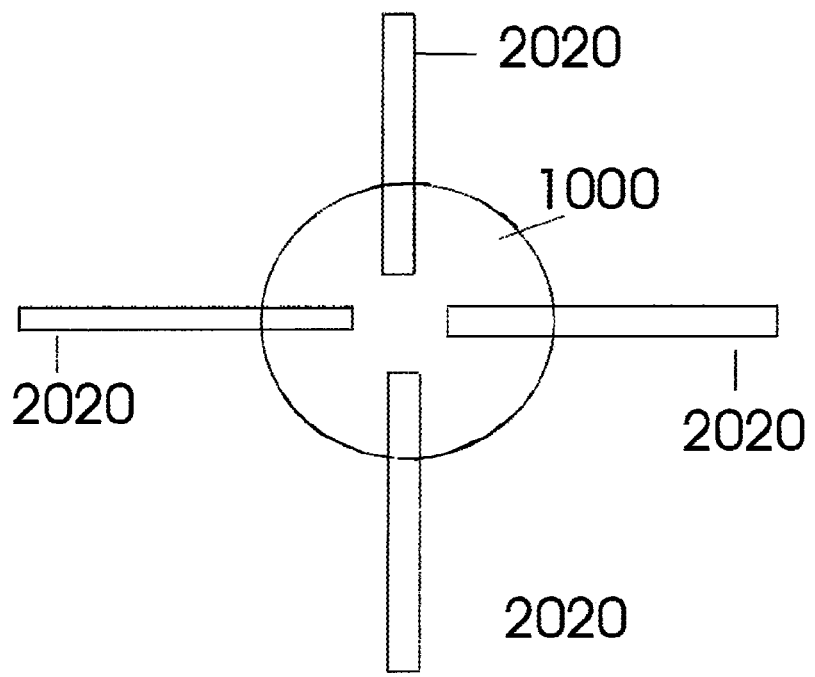
FIG. 26 illustrates excitation of a spherical laser according to an embodiment of the present invention.

A spherical laser having an active media is photonically excited. Optical pumping (excitement of the active gain media 115) can take place ether outside or within the spherical apparatus as depicted in FIG. 21, where the spherical laser 1000 is excited with one or more external photonic sources (2000 flash lamps depicted in FIG. 21, laser diodes 2010 illustrated in FIG. 23, optical fiber 2020 illustrated in FIG. 25), or and internal sources as depicted in FIG. 22, 24, or 26.

Multi-wavelength operation can also be achieved by utilizing a non-uniform gain medium (consisting of spherical shells 115-1 thru 115-4 or isolated portions of the spherical resonator (for example one hemisphere containing a first active media number, while the second hemisphere contains a second optical media), localized optical mirrors 103 are tailored to allow entrance of excitation of photons while semi-reflecting photons at the lasing wavelength with different mirror configurations pertaining to each specific active media.

Figure 27:
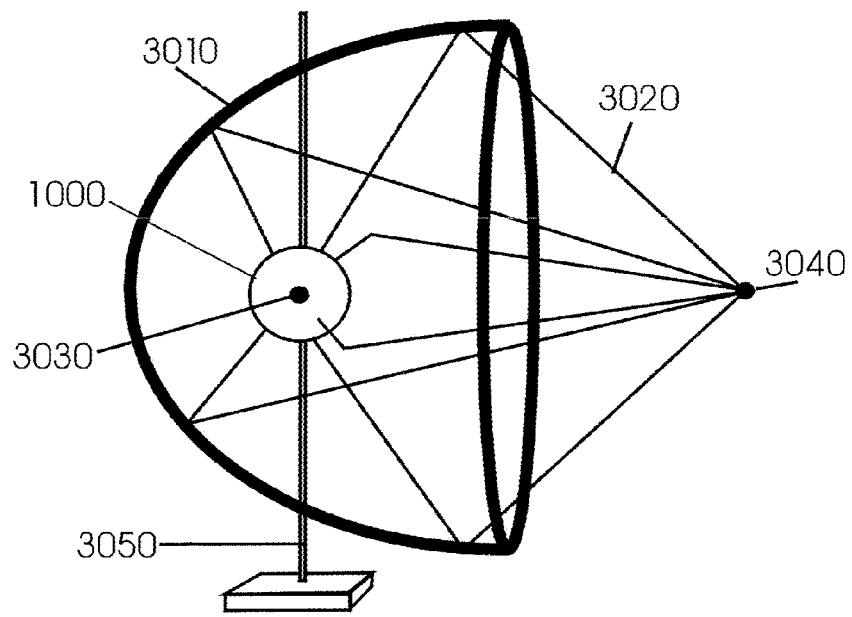
FIG. 27 is a schematic view of the spherical laser in use with an ellipsoidal collection mirror.

The exiting radial laser emission is harnessed by placing the spherical laser inside a three dimensional mirror apparatus. The mirror apparatus consisting of a partial three dimensional elliptical mirror is depicted in FIG. 27. The spherical laser denoted by 1000 is positioned at a focal point of the ellipsoidal collection mirror 3010, supported by rod 3050. The ellipsoidal mirror in FIG. 27 is drawn transparently for illustrative purposes. Radial emission emulating from the spherical laser located at the left focal point 3030 will be imaged at the right focal point 3040. The imaged beam may be harnessed within an enclosed ellipsoidal mirror or a section of the ellipsoidal mirror as illustrated in FIG. 27. Typical ray traces are shown 3020 illustrating this effect.

Figure 28:
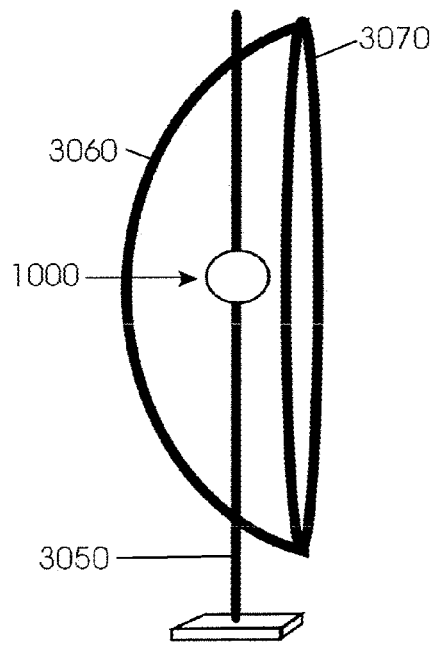
FIG. 28 is a schematic view of the spherical laser in use with a parabolic collection mirror.

Alternatively, a columnated beam may be generated by placing the spherical laser source within a parabolic mirror, see FIG. 28. FIG. 28 shows the Spherical laser 1000 inside a parabolic collection mirror 3060, the laser emission is columnated as illustrated with ray traces 3070.

Figure 29:
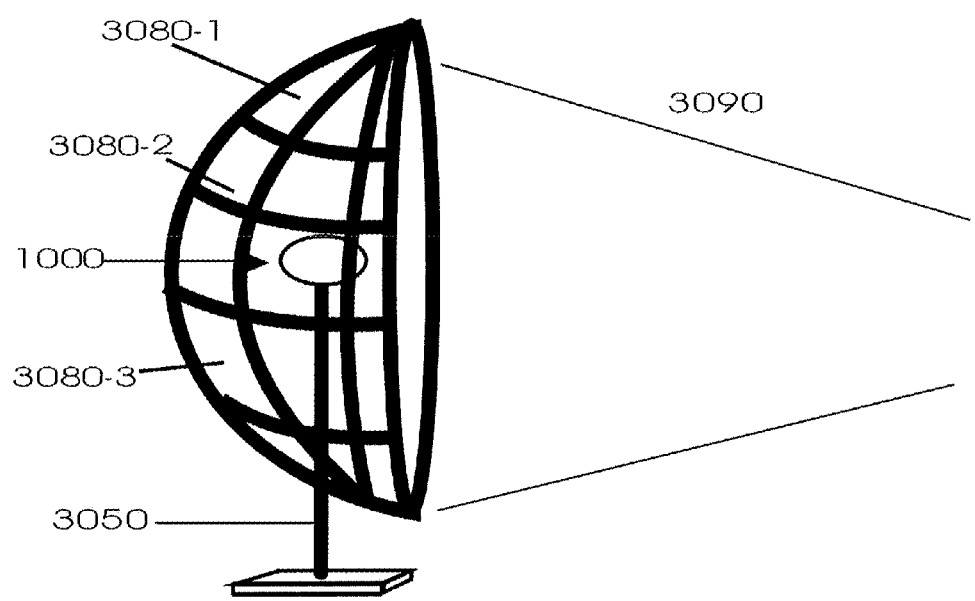
FIG. 29 is a schematic view of the spherical laser in use with a multi-mirrored parabolic collection structure.

Alternatively, a 3-D mirror is assembled by a multitude of small individually positional mirrors 3080 (similar that the concept utilized in adaptive optics) to position the imaged spot at any given distance from the sources, see trajectory 3090 in FIG. 29.

The total output power is the integration of the exiting radiation across the spherical surface of the OC. Scalability is achieved by increasing both R1 and R2 maintaining a constant separation (R2–R1), this maintains the same optical power surface density, while increasing the surface area of the OC thus increasing the total output power.

Figure 30:
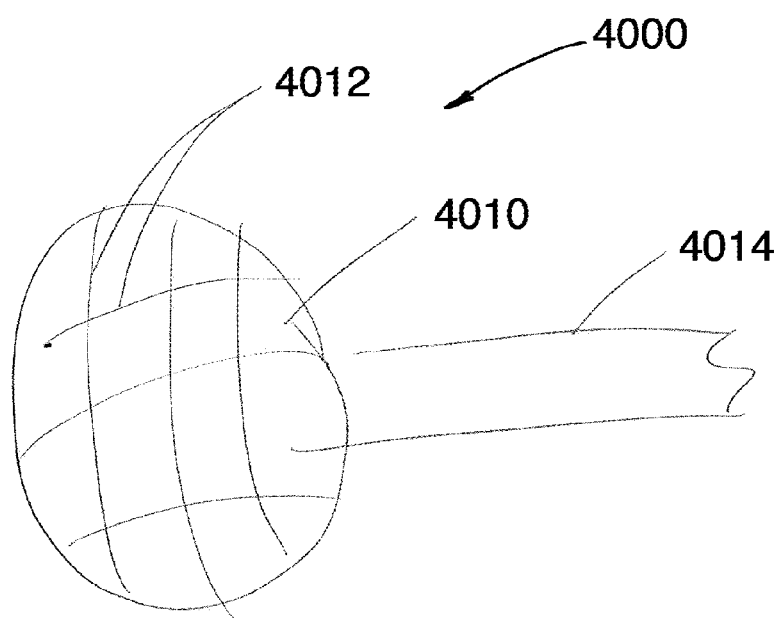
FIG. 30 illustrates spherical resonator according to an embodiment of the present invention.

In still another embodiment, a mode tailored spherical resonator 4000 is shown in FIG. 30. The mode tailored spherical resonator 4000 has a solid sphere 4010 of an optically transparent media that is not active and an optically different regions 4012 (stripes of alternate optical parameters) extend diametrically about the solid sphere 4010 to deter whispering gallery modes. The optically different regions 4012 act as an obstruction in the optical path of a given whispering gallery mode.

It is envisioned that the mode tailored spherical resonator be excited by a fiber optic wire 4014.

Embodiments of another mode tailored spherical laser 4010 is shown in FIG. 31. The mode tailored spherical laser 4010 is generally similar to the spherical laser 1000 described above, but the mode tailored spherical resonator 4010 has an optically transparent media 4115 that is not active and optically different regions 1002 to deter whispering gallery modes. The optically different regions 4012 act as an obstruction in the optical path of a given whispering gallery mode.

Embodiments of another mode tailored spherical laser 4020 is shown in FIGS. 12 and 33. The mode tailored spherical laser 4020 is generally similar to the spherical laser 1000 described above, but the mode tailored spherical resonator 4010 has an optically transparent media 4115 that is not active and optically different regions 1002 to deter whispering gallery modes. The optically different regions 4012 act as an obstruction in the optical path of a given whispering gallery mode.

As should be appreciated, according to the description above, the excitation means for exciting the medium will depend on the medium used, and may include a light source for optical pumping, applied electric potentials/voltages or other electrical signals, chemical reactions, or the like.

Since certain changes may be made in the above-described scalable spherical laser, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The mode tailored spherical resonators include optically active cavity media, including solid, liquid, gas, chemical, single and multiple regions. Excitation mechanisms may include photonic (lamps, laser diodes, LEDs, optically pumped fibers), electrical (Potential Field), electro-magnetic (Radio Freq for exp), and chemical. Harnessing apparatus may include 3-D ellipse, 3D parabola, and in general 3-D surface somewhere in between the ellipse and parabola to image the beam at a desired distance from the source. "Think of the 3D surface comprising of a multitude of small optical mirrors each capable of being positioned in space. In one configuration the 3D surface could be fashioned to approximate an ellipse, altering the individual mirrors the 3D surface could be made to approximate a parabola, all shapes in-between could also be approximated. This methodology is referred to as adaptive optics.

What is claimed is:

1. A spherical laser apparatus comprising:
   a first generally spherical body having a semi-reflective surface for optical feedback of a prescribed lasing wavelength thus establishing an optical cavity;
   a second generally spherical body having a reflective surface and a radius smaller than a radius of the first body, wherein the first and second bodies are generally concentrically positioned to form a generally spherical, concentric cavity there between;
   at least a first optical medium being disposed in the concentric cavity between the two reflecting surfaces for establishing resonant modes upon excitation;
   wherein the first generally spherical body has a plurality of regions, differing in at least one optical parameter from each other, that extend diametrically about the semi-reflective surface and/or radially within the first generally spherical body for tailoring modal constituency via gain and/or loss index tailoring and for offsetting the modal confinement factor to extinguish whispering gallery modes.

2. The apparatus of claim 1, further comprising: a support apparatus attached to the first and second bodies for maintaining generally concentric positioning of the first and second bodies.

3. The apparatus of claim 2, wherein the excitation device includes at least one electrode outside or at the surface of the first body and a second electrode encased in or at the surface of the second body, with a voltage source connected across the two electrodes.

4. The apparatus of claim 3, wherein at least one of the first and second electrodes comprises one of a conductive mesh or semi-transparent coating.

5. The apparatus of claim 1, wherein the semi-reflective surface of the first body or the reflective surface of the second body is characterized by wavelength dependent reflection and transmission to provide optical excitation and gain.

6. A mode tailored spherical laser apparatus, comprising:
   a generally spherical shell formed of a first optically active media and of an alternative optical media,
   said first optically active media and said alternative optical media being disposed in multiple defined regions for mode tailoring, and having optically semi-reflective mirror coatings applied to the outer spherical surface and to the interior spherical surface,
   at least one of the mirror coatings allowing transmission of pump energy into the shell,
   said alternative optical media differing from the first optically active media in at least one bulk optical parameter for tailoring modal constituency via gain and/or loss index tailoring and for offsetting the modal confinement factor to favor radial mode operation,
   wherein at least one of said alternative optical media optical parameters is selected to prevent optical amplification thru the absence of gain or by optical attenuation in any optical mode overlapping said second optical region.

7. The apparatus of claim 6, further comprising an excitation device configured for controllable excitation of said optically active media to participate in modal tailoring through confinement factor offsetting via non-uniform excitation.

* * * * *